(12) United States Patent
Ureel et al.

(10) Patent No.: US 9,729,002 B2
(45) Date of Patent: *Aug. 8, 2017

(54) AUDIENCE RESPONSE SYSTEM WITH BATTERYLESS RESPONSE UNITS

(71) Applicant: Fleetwood Group, Inc., Holland, MI (US)

(72) Inventors: Emil J. Ureel, Holland, MI (US); Kyle A. Israels, Zeeland, MI (US)

(73) Assignee: Fleetwood Group, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,672

(22) Filed: Nov. 21, 2016

(65) Prior Publication Data

US 2017/0163075 A1    Jun. 8, 2017

Related U.S. Application Data

(62) Division of application No. 13/709,553, filed on Dec. 10, 2012, now Pat. No. 9,537,324.

(60) Provisional application No. 61/570,569, filed on Dec. 14, 2011, provisional application No. 61/708,171, filed on Oct. 1, 2012.

(51) Int. Cl.
    *H02J 7/00*     (2006.01)
    *H02J 7/02*     (2016.01)

(52) U.S. Cl.
    CPC .................................. *H02J 7/025* (2013.01)

(58) Field of Classification Search
    CPC ....................................................... H02J 7/345
    USPC ......................................................... 320/167
    See application file for complete search history.

(56) References Cited

U.S. PATENT DOCUMENTS

| | | |
|---|---|---|
| 3,454,012 A | 7/1969 | Raddi |
| 3,938,018 A | 2/1976 | Dahl |
| 4,158,230 A | 6/1979 | Washizuka et al. |
| 4,271,404 A | 6/1981 | Tanaka |
| 4,418,416 A | 11/1983 | Lese et al. |
| 4,544,923 A | 10/1985 | Blatter et al. |
| 4,544,924 A | 10/1985 | French |
| 4,654,573 A | 3/1987 | Rough et al. |

(Continued)

FOREIGN PATENT DOCUMENTS

| | | |
|---|---|---|
| EP | 1542332 A1 | 6/2005 |
| EP | 2387129 A2 | 11/2011 |

OTHER PUBLICATIONS

European Search Report from corresponding European Patent Application No. 12197196.4 entitled Audience Response System With Batteryless Response Units, Nov. 28, 2013.

*Primary Examiner* — Yalkew Fantu
(74) *Attorney, Agent, or Firm* — Gardner, Linn, Burkhart & Flory, LLP

(57) ABSTRACT

A wireless response system and method of receiving user input selections at a base station includes distributing a plurality of response units to users. The response units wirelessly communicate with the base station in order to retrieve user responses received by the response units. Each of the response units has a user input device that is configured to receiving user input selections, a controller that is responsive to the user input device to process user inputs and to communicate responses wirelessly to the base station and a power supply having a super capacitor. The super capacitor is charged with a wireless-charging circuit and current is supplied from the super capacitor to the controller. Current supplied to the controller is controlled.

24 Claims, 21 Drawing Sheets

(56) References Cited

U.S. PATENT DOCUMENTS

| | | |
|---|---|---|
| 4,777,488 A | 10/1988 | Carlman, Jr. et al. |
| 5,568,035 A | 10/1996 | Kato et al. |
| 5,692,203 A | 11/1997 | Grodevant |
| 5,724,357 A | 3/1998 | Derks |
| 6,049,701 A | 4/2000 | Sparksman |
| 6,057,668 A | 5/2000 | Chao |
| 6,301,128 B1 | 10/2001 | Jang et al. |
| 6,703,920 B2 | 3/2004 | Zimmer |
| 6,819,013 B2 | 11/2004 | Kelly et al. |
| 7,180,265 B2 | 2/2007 | Naskali et al. |
| 7,208,912 B2 | 4/2007 | Ghabra et al. |
| 7,208,916 B1 | 4/2007 | Boatwright et al. |
| 7,263,388 B2 | 8/2007 | Yamamoto |
| 7,288,918 B2 | 10/2007 | DiStefano |
| 7,323,849 B1 | 1/2008 | Robinett et al. |
| 7,495,414 B2 | 2/2009 | Hui |
| 7,518,267 B2 | 4/2009 | Baarman |
| 7,633,263 B2 | 12/2009 | Toya |
| 7,639,095 B2 | 12/2009 | Ocket et al. |
| 7,642,755 B2 | 1/2010 | Bartilson |
| 7,649,344 B2 | 1/2010 | Bang et al. |
| 7,684,768 B1 | 3/2010 | Fest et al. |
| 7,804,197 B2 | 9/2010 | Iisaka et al. |
| 7,825,625 B2 | 11/2010 | Pusamentier |
| 7,826,873 B2 | 11/2010 | Telefus |
| 7,868,586 B2 | 1/2011 | Petterson et al. |
| 7,868,587 B2 | 1/2011 | Stevens et al. |
| 7,872,444 B2 | 1/2011 | Hamilton et al. |
| 7,873,394 B2 | 1/2011 | Gong et al. |
| 7,919,886 B2 | 4/2011 | Tanaka |
| 2002/0001745 A1 | 1/2002 | Gartstein et al. |
| 2002/0027424 A1 | 3/2002 | Nantz et al. |
| 2003/0215780 A1 | 11/2003 | Saar et al. |
| 2004/0021446 A1 | 2/2004 | Bang et al. |
| 2005/0127868 A1 | 6/2005 | Calhoon et al. |
| 2005/0162125 A1 | 7/2005 | Yu et al. |
| 2006/0063522 A1 | 3/2006 | McFarland |
| 2006/0166685 A1 | 7/2006 | Adkins |
| 2006/0281435 A1 | 12/2006 | Shearer et al. |
| 2007/0015531 A1 | 1/2007 | Disalvo |
| 2008/0079399 A1 | 4/2008 | Schiller |
| 2008/0169791 A1 | 7/2008 | Daio |
| 2008/0315829 A1 | 12/2008 | Jones et al. |
| 2009/0108680 A1 | 4/2009 | Minemura |
| 2009/0209291 A1 | 8/2009 | Ramprasad et al. |
| 2009/0212636 A1 | 8/2009 | Cook et al. |
| 2009/0224609 A1 | 9/2009 | Cook et al. |
| 2009/0243397 A1 | 10/2009 | Cook et al. |
| 2010/0256710 A1 | 10/2010 | Dinsmoor et al. |
| 2011/0018498 A1 | 1/2011 | Soar |
| 2011/0175568 A1 | 7/2011 | Leijssen et al. |
| 2011/0181237 A1 | 7/2011 | Hamedi-Hagh et al. |
| 2011/0248685 A1 | 10/2011 | Khan |
| 2013/0154581 A1 | 6/2013 | Ureel et al. |

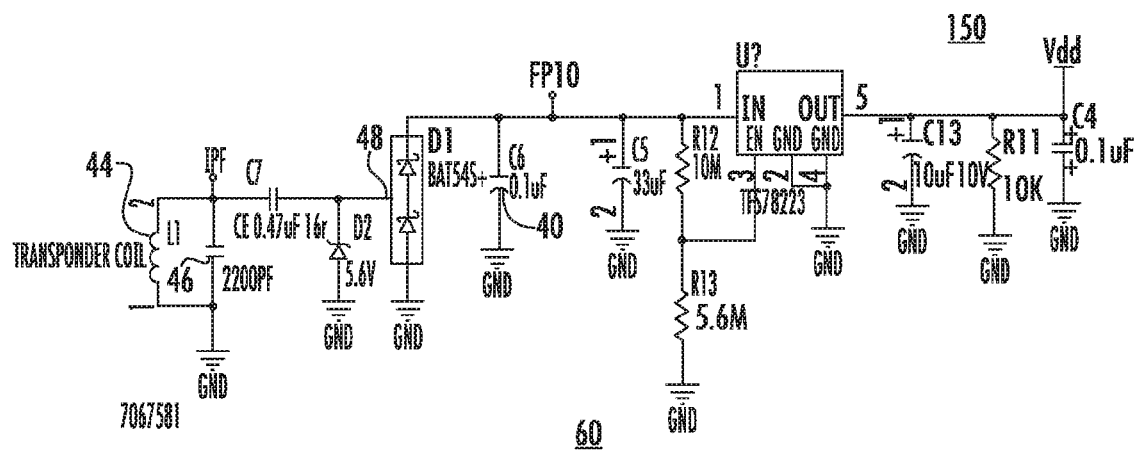
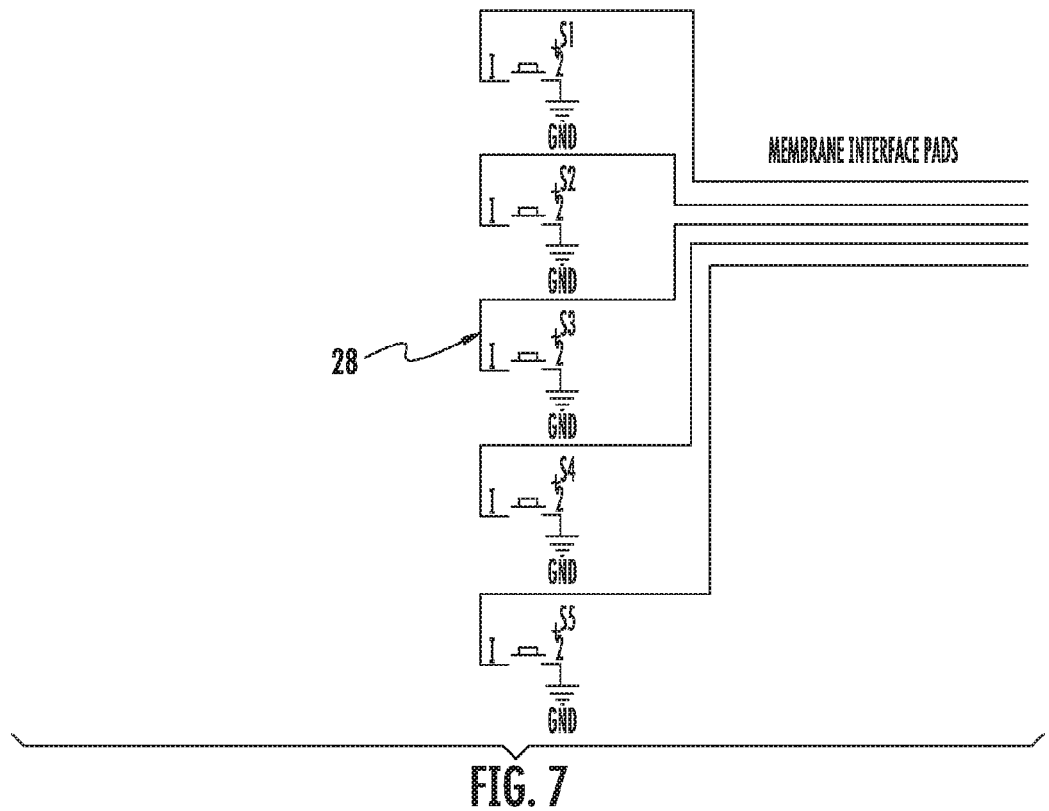
FIG. 7

AUDIENCE RESPONSE SYSTEM WITH BATTERYLESS RESPONSE UNITS

CROSS-REFERENCE TO RELATED APPLICATIONS

This application is a division of U.S. patent application Ser. No. 13/709,553 filed on Dec. 10, 2012, which claims priority from U.S. provisional patent application Ser. No. 61/570,569, filed on Dec. 14, 2011, and U.S. provisional patent application Ser. No. 61/708,171, filed on Oct. 1, 2012, the disclosures of which are hereby incorporated herein by reference in their entirety.

BACKGROUND OF THE INVENTION

The present invention is directed to a portable electronic device and, in particular, to a wireless audience response system and method for wirelessly receiving user selections at a base station and, more particularly, to a wireless response system in which the response units are powered without a battery.

The use of chemical reaction batteries have proliferated along with the proliferation of wireless electronic devices. Such batteries create environmental concerns because they are often disposed in landfills where their chemicals can leach into ground water.

SUMMARY OF THE INVENTION

The present invention is directed to a portable electronic device, such as an audience response system and method for wirelessly receiving user selections at a base station in which the response units are powered with a super capacitor in lieu of a battery. This is accomplished in a manner that the super capacitor can be charged wirelessly, such as by inductive coupling, in a manner that avoids difficulties associated with such technique.

A portable electronic device and method, according to an aspect of the invention, includes a controller and a power supply having a super capacitor. The super capacitor is charged with a wireless-charging circuit and current is supplied from the super capacitor to the controller. Current supplied to the controller is controlled. In certain embodiments, current supplied to the controller is limited in a manner that allows the super capacitor to acquire sufficient charge from the wireless charger to operate the controller. In certain embodiments current is withheld from the controller until operation of an event.

A wireless response system and method of receiving user input selections at a base station, according to an aspect of the invention, includes distributing a plurality of response units to users. The response units wirelessly communicate with the base station in order to retrieve user responses received by the response units. Each of the response units has a user input device that is configured to receiving user input selections, a controller that is responsive to the user input device to process user inputs and to communicate responses wirelessly to the base station and a power supply having a super capacitor. The super capacitor is charged with a wireless-charging circuit and current is supplied from the super capacitor to the controller. Current supplied to the controller is controlled. For example, current supplied to the controller may be limited in a manner that allows the super capacitor to acquire sufficient charge from the wireless charger to operate the controller.

The wireless-charging circuit may include a pickup coil. The charging circuit may further include a resonance capacitor combined with the coil thereby defining a resonance circuit. The resonance circuit may resonate at a low frequency, such as at a frequency that is below approximately 100 kilohertz, at a frequency that is below approximately 50 kilohertz and, in particular, at a frequency that is at approximately 38 kilohertz. The charge circuit may include a voltage multiplier.

A load regulator may be provided that is configured to substantially withhold power from the controller until occurrence of an event, such as user actuation of the user input device. The load regulator may be in the form of a power impulse circuit that is configured to apply an output voltage to the controller for a limited period of time. The output voltage may be applied upon occurrence of the event. The power impulse circuit may include a voltage regulator and a trigger that enables the voltage regulator to apply the output voltage to the controller. The trigger may enable the voltage regulator for a limited period of time upon an event, namely, actuation of the user input device. The trigger may be in the form of a one-shot circuit. The voltage regulator may be a low drop-out voltage regulator.

The load regulator may be a voltage detecting a power source that is adapted to withhold power from the controller until the voltage on the super capacitor reaches a particular level. The power source may be configured to supply power to the controller when the voltage on the super capacitor reaches the particular level and continues to supply power to the controller even when the voltage on the super capacitor decreases below the particular level. The power source may be a voltage regulator, such as a low drop-out voltage regulator.

The controller may be programmed to respond to an application of power to the controller by entering a quiescent mode. The controller may be programmed to stay in a reset mode until the voltage on the super capacitor reaches a particular level. The controller may be programmed to respond to the voltage on the super capacitor reaching the particular level by configuring inputs and outputs of the controller and entering the quiescent mode. The controller may be programmed to awake from the quiescent mode in response to the operation of the user input device.

A wireless charging station may be configured to inductively couple electrical energy to the wireless-charging circuit. The wireless charging station may include a charging coil and a coil-driving circuit. The charging coil may be configured to inductively couple with a plurality of response units. The coil may include one or more loops that are configured to at least partially surround the plurality of response units. The loop(s) may completely surround the plurality of response units.

The coil-driving circuit may include a resonance circuit incorporating the coil. The coil-driving circuit may include a pair of electrical series connected field-effect transistors and a transistor drive circuit. The transistor drive circuit may ensure that only one of the transistors is conducting at a time. The transistor drive circuit may provide dead time during which neither of the transistors is conducting between intervals when one of the transistors is conducting. The coil driving circuit may include an auto-tuning circuit that regulates voltage across the charging coil by modifying the frequency of the coil driving circuit. The coil driving circuit may include an error detection circuit that determines that the auto-tuning circuit has failed to achieve regulation. The error detection circuit may monitor voltage across the charging coil and resets the auto-tuning circuit if the voltage across the charging coil is below a threshold.

A wireless response system and method of receiving user input selections at a base station, according to another aspect of the invention, includes a base station and a plurality of response units. The response units are adapted to wirelessly communicate with the base station in order to retrieve user responses received by the response units. Each of said response units has a user input device that is adapted to receiving user input selections, a controller that is responsive to the user input device to process user inputs and to communicate responses wirelessly to the base station and a power supply that is adapted to supply power to operate the controller. The power supply includes a super capacitor and a wireless-charging circuit that is adapted to charge the super capacitor. The wireless-charging circuit is adapted to supply a current to charge the super capacitor. A power impulse circuit is adapted to apply an output voltage to the controller upon operation of the user input device.

The power impulse circuit may apply an output voltage to the controller for a limited period of time upon operation of the user input device. The power impulse circuit may include a voltage regulator and a trigger. The trigger enables the voltage regulator to apply the output voltage to the controller. The trigger may enable the voltage regulator for a limited period of time upon actuation of the user input device. The voltage regulator may be a low drop-out voltage regulator. The trigger may be a one-shot circuit.

While described as embodied in an audience response system, certain aspects of the invention may be applied to various portable electronic devices, such as cell phones, digital assistants, remote controllers, real-time locating systems, and the like. These and other objects, advantages and features of this invention will become apparent upon review of the following specification in conjunction with the drawings.

BRIEF DESCRIPTION OF THE DRAWINGS

FIG. 7 is a partial electronic schematic diagram of the response unit in FIG. 6;

FIG. 13 is an exploded perspective view of the wireless charging station illustrated in FIG. 12a;

DESCRIPTION OF THE PREFERRED EMBODIMENT

Figure 1:
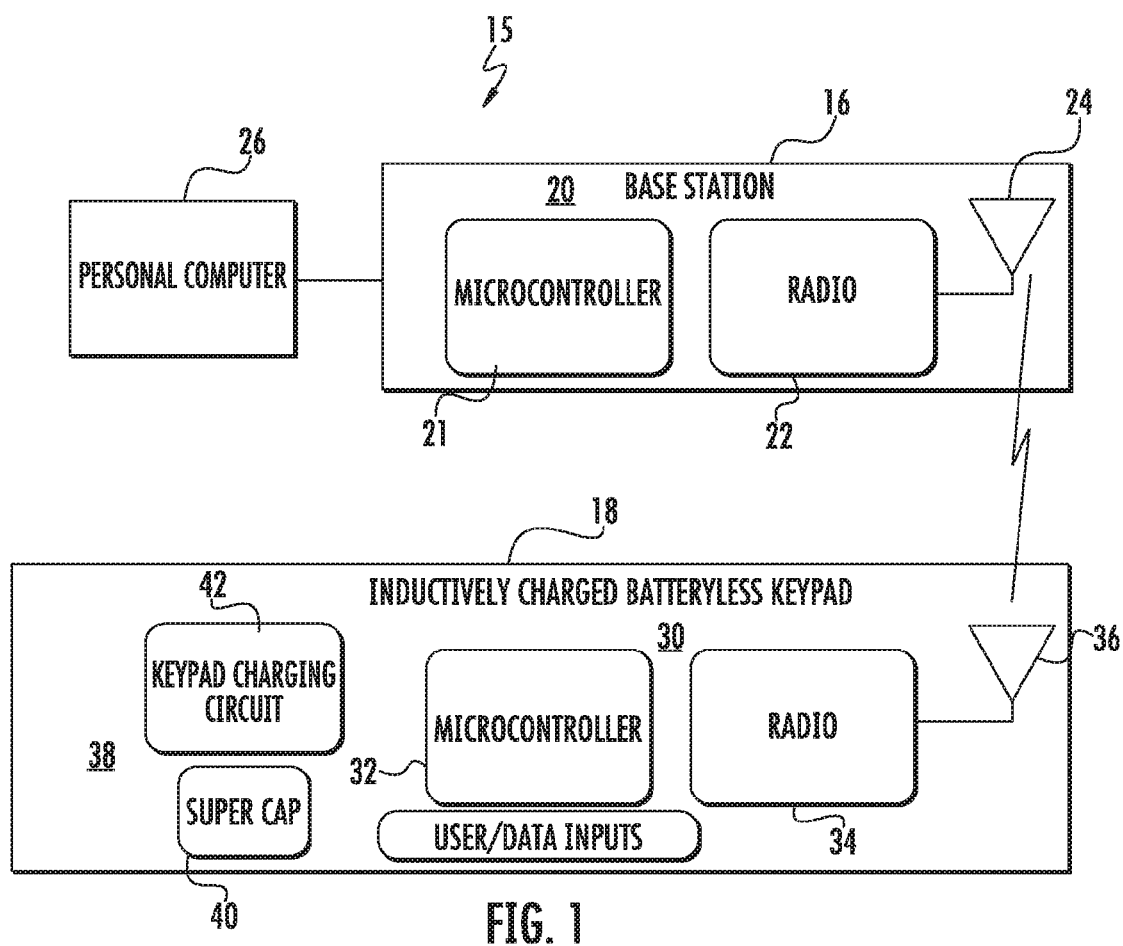
FIG. 1 is a block diagram of an audience response system, according to an embodiment of the invention.
Figure 2:
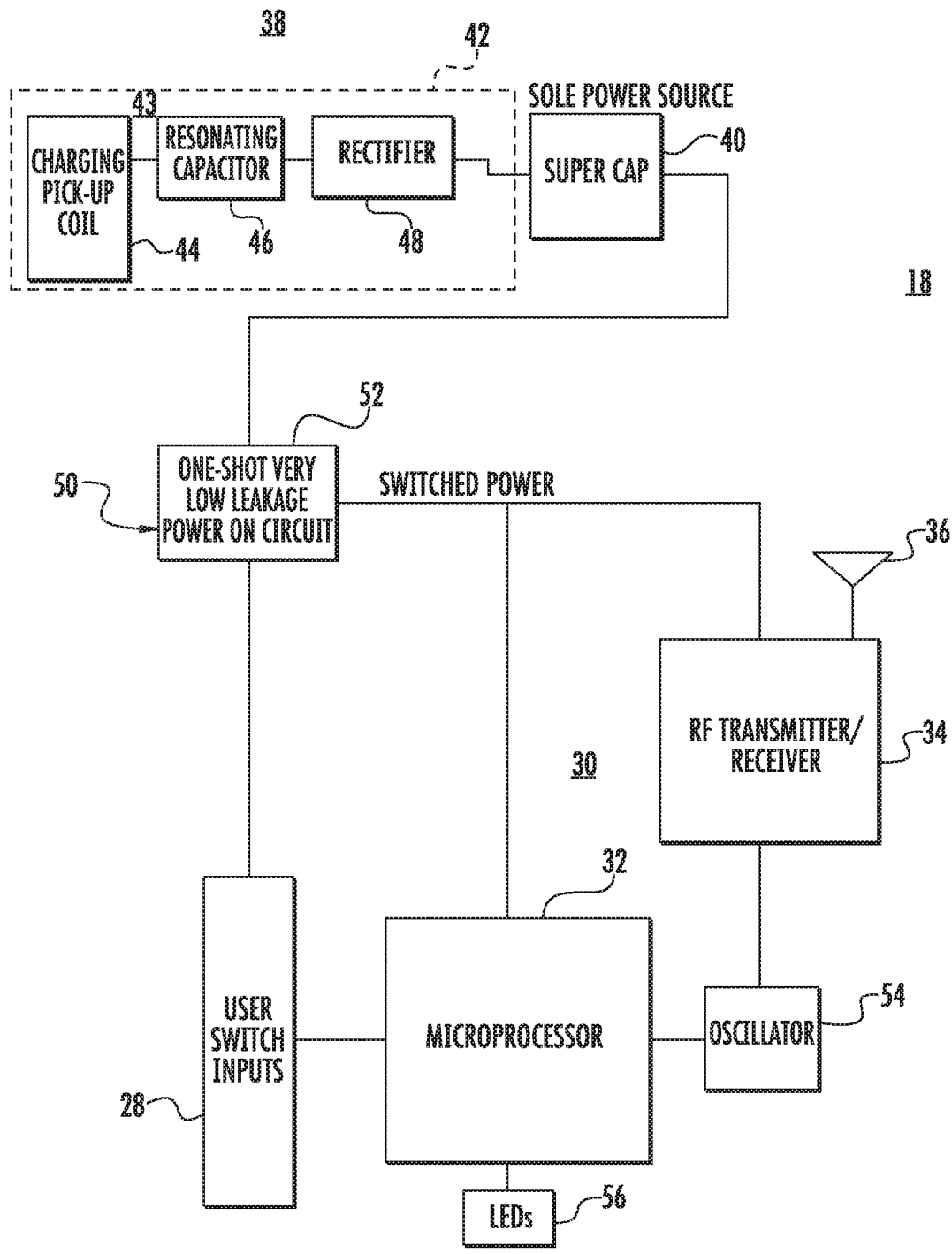
FIG. 2 is a block diagram of a response unit.
Figure 3:
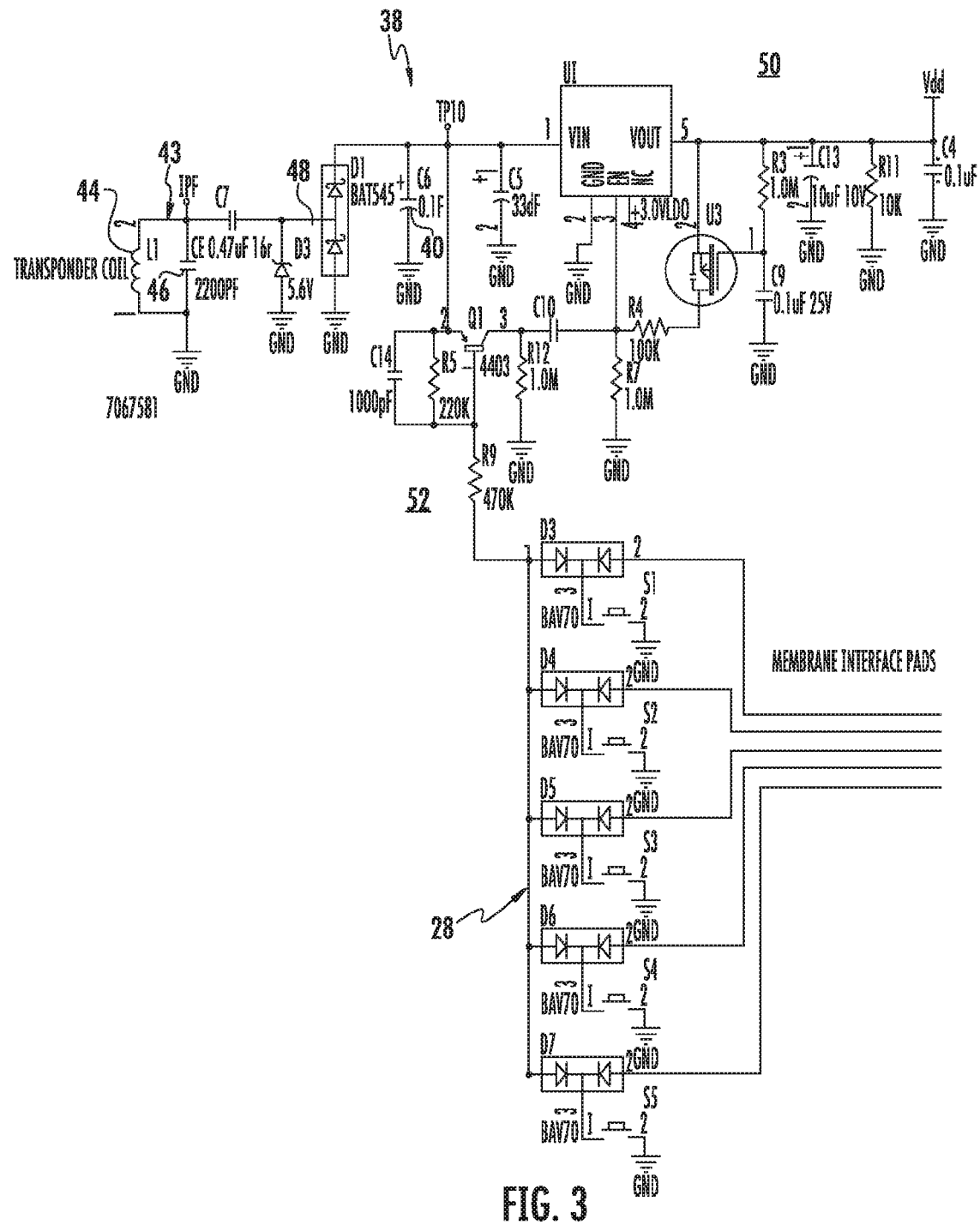
FIG. 3 is a partial electronic schematic diagram of the response unit in FIG. 2.
Figure 4A:
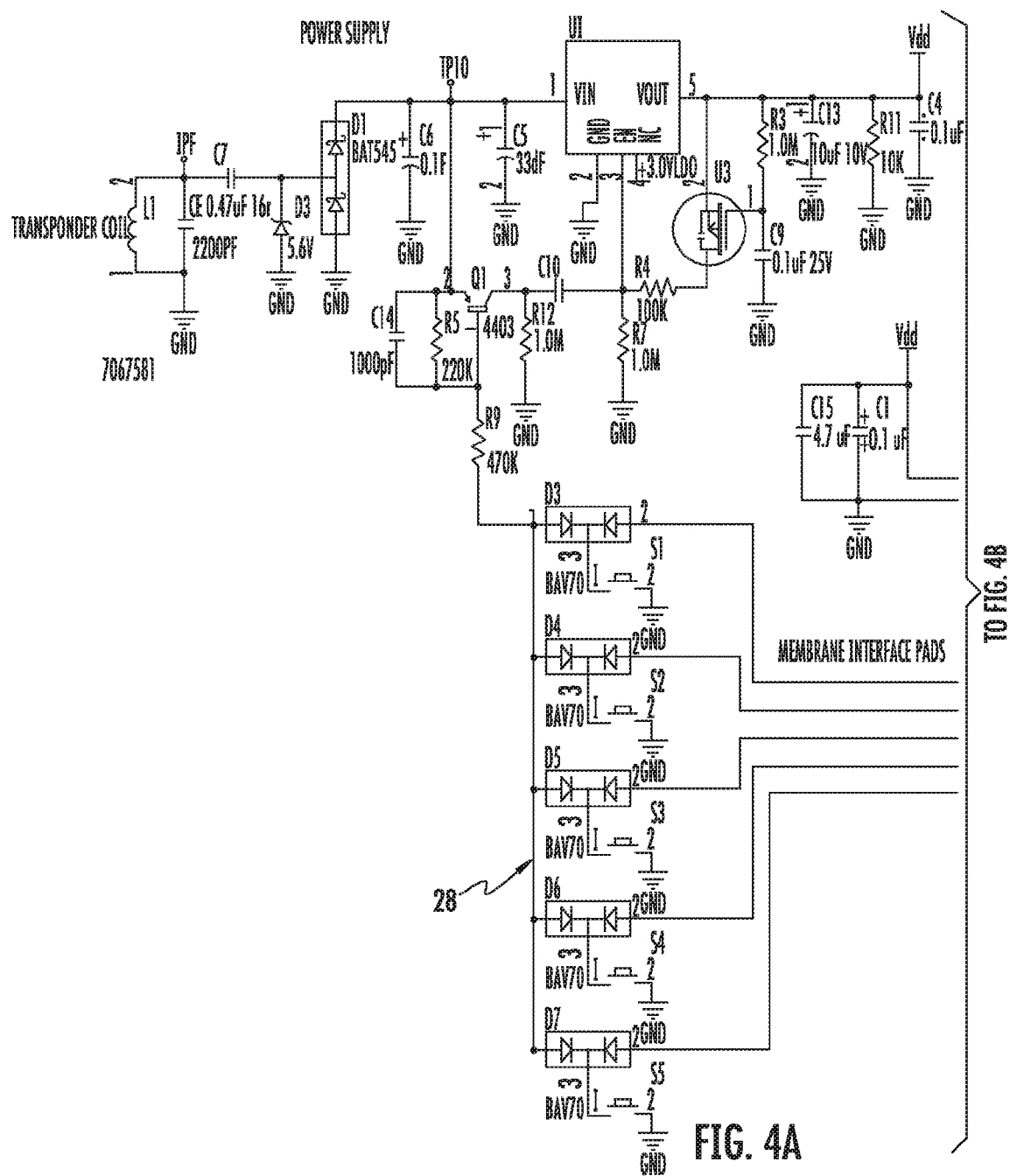
FIG. 4A is one portion of a more complete electronic schematic diagram of the response unit in FIG. 2, including a microprocessor.
Figure 4B:
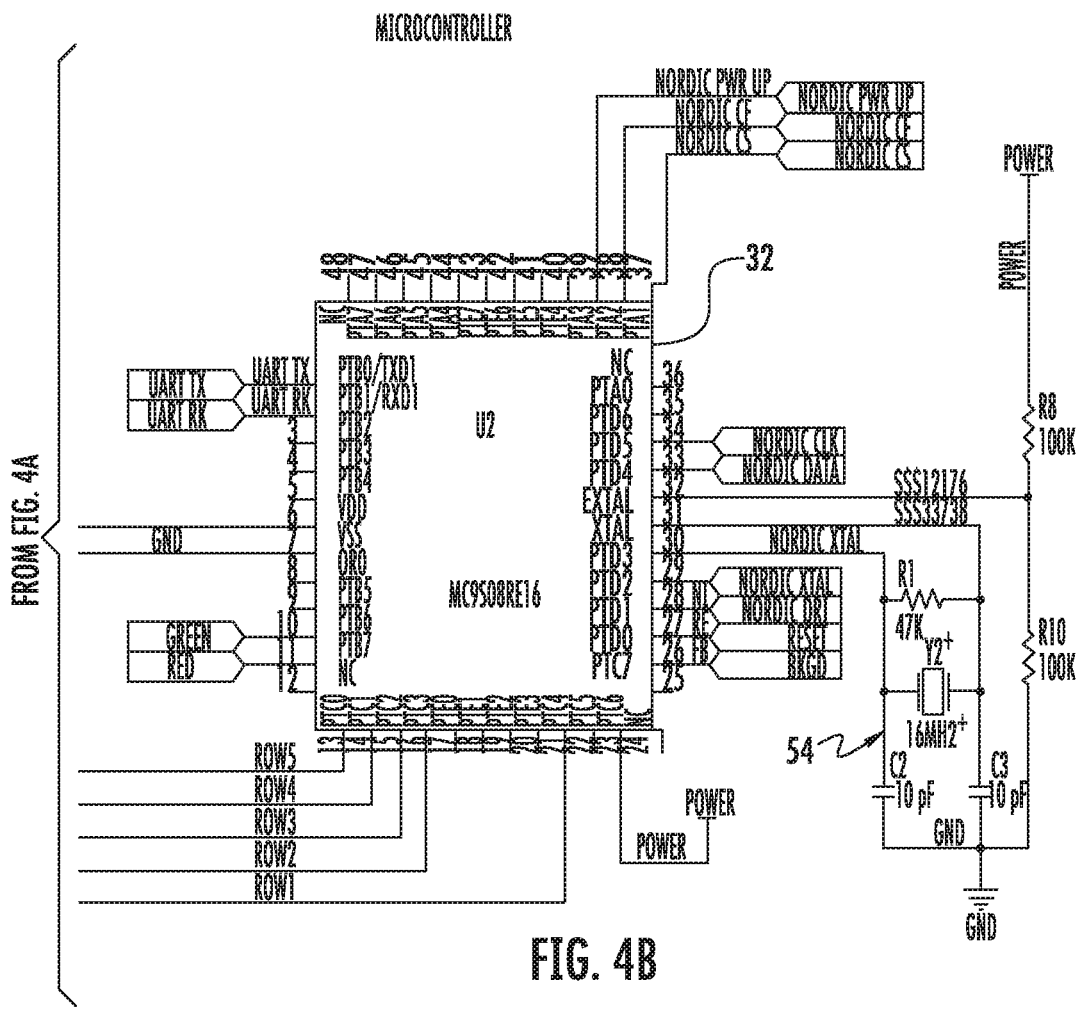
FIG. 4B is the other portion of the electronic schematic diagram in FIG. 4A.
Figure 5:
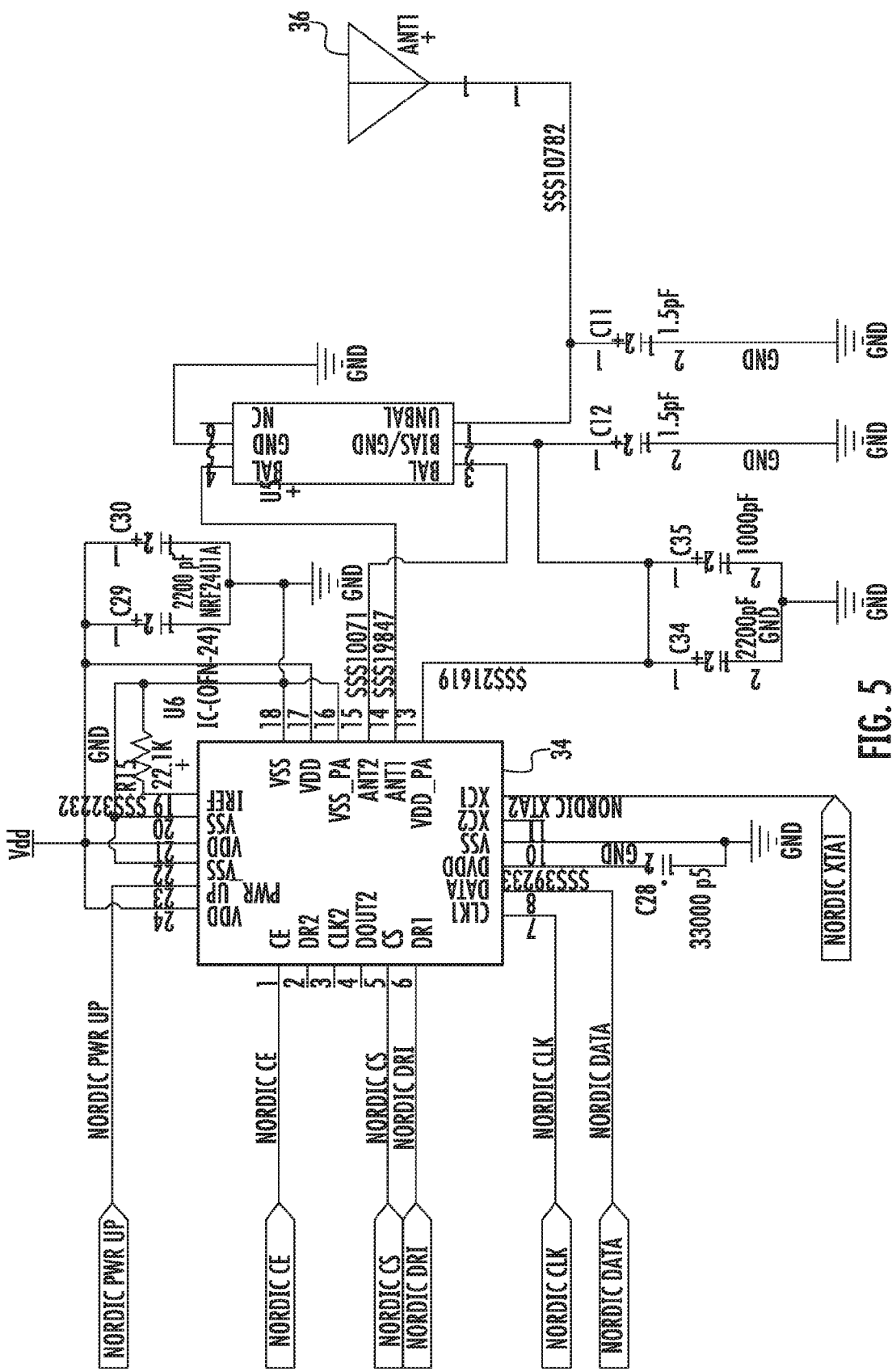
FIG. 5 is an electronic schematic diagram of a wireless transceiver useful with the response unit in FIG. 2.

Referring now to the drawings and the illustrative embodiments depicted therein, a wireless response system 15 includes a base station 16 and a plurality of response units, or keypads, 18 that are in wireless communication with base station 16 in order to retrieve user responses received by the response units (FIG. 1). Response system 15 operates according to the principles disclosed in commonly assigned U.S. Pat. Nos. 5,379,213; 5,724,357; Re. 35,449; 6,021,119; 6,665,000; 7,277,671; 7,008,027; 7,599,703; 7,746,820; 7,747,261; 8,223,709 and 8,254,310 and U.S. Patent Application Publication Nos. 2003/0153347 A1; 2007/0064902 A1; 2003/0153321 A1; 2002/0143415 A1; 2003/0236891 A1; 2008/0316953 A1; 2009/0040183 A1; 20100061282A1; 2010/0087139 A1; 2010/0105331 A1 and 2007/0042724 A1, the disclosures of which are hereby collectively incorporated herein by reference.

Base station 16 includes a base station controller 20 made up of a microcontroller, or microprocessor, 21 and a radio, or wireless transceiver, 22 that is connected with an antenna 24 to transmit and receive wireless communication signals. Each response unit 18 has a user input device 28, such as a touch screen or touch pad, that is adapted to receive user input selections, a controller 30 made up of a microcontroller or microcomputer 32 and radio, or wireless transceiver, 34 that is connected with an antenna 36 to wirelessly communicate with base station 16. Controller 30 is responsive to user input device 28 to process user inputs and to communicate responses wirelessly to base station 16. Each response unit 18 further includes a power supply 38 that is adapted to supply power to operate the response unit including controller 30. Power supply 38 includes a super capacitor, also known as an ultra capacitor, 40 and a wireless-charging circuit 42 that is adapted to charge super capacitor 40 from a wireless charging station 90, not shown in FIG. 1. Wireless-charging circuit 42 is configured to supply a current to charge super capacitor 40 and super capacitor 40 is configured to provide the sole power source for controller 30. As will be described in more detail below, response unit controller 30 is configured to limit the current that is drawn from super capacitor 40 in a manner that allows super capacitor 40 to acquire a sufficient charge from wireless-charging circuit 42 to operate controller 30. In the illustrated embodiment, super capacitor 40 has a capacitance value of 0.1 farads, but other values may be used.

In the illustrated embodiments, wireless-charging circuit 42 includes a pickup coil 44 and a resonance capacitor 46 that is combined with coil 44 to define a resonance circuit 43. Resonance circuit 43 resonates at a low frequency, such as at a frequency that is below approximately 100 kilohertz and even below approximately 50 kilohertz. In the illustrated embodiments, resonance circuit 43 resonates at a frequency that is at approximately 38 kilohertz. This has the advantage of resonating at a frequency that does not generally interfere with other wireless communication devices. This may be accomplished by resonance circuit 43 having a high Q value. This, in turn, is accomplished by pickup coil 44 being a high inductance, low current coil. In the illustrated embodiments, pickup coil 44 is a transponder coil that is of the type used in radio frequency identification (RFID) devices and has an inductance of greater than 5 millihenry. In the illustrated embodiments, coil 44 has an inductance of 7.2 millihenry. Such coil is commercially available as an RFID transponder coil Model 5315TC from Coilcraft, Inc. in Cary, Ill. Wireless charge circuit 42 includes a rectifier 48. Rectifier 48 is in the form of a voltage multiplier, such as a voltage doubler. Such voltage multiplier provides a higher voltage, such as 6 volts peak-to-peak, on super capacitor 40, but requires a longer charge time.

In an embodiment illustrated in FIGS. 2-5, power supply 38 includes a load regulator 50. Load regulator 50 substantially withholds power from controller 30 until the occurrence of an event. Load regulator 50 may include a power impulse circuit 52 that applies an output voltage to controller 30 for a limited period of time upon occurrence of the event. In the illustrated embodiment in FIG. 3, load regulator 50 includes a voltage regulator U1 and power impulse circuit 52 includes a trigger that enables voltage regulator U1 to apply its output voltage to controller 30 for a limited period of time upon actuation of user input device 28. More particularly, power impulse circuit 52 is in the form of a one-shot circuit including a transistor Q1 connected with the enabling input of regulator U1 through a capacitor C10. A field-effect transistor U3 couples the enable input of regulator U1 with its output. The base of transistor Q1 is connected the switches of user input device 28 through a diode set D3-D7.

Load regulator 50 operates as follows. When response unit 15 is brought into inductive coupling range with wireless charging station 90, the enabling input of voltage regulator U1 is disabled, thus preventing voltage regulator U1 from producing a voltage Vdd supplied to controller 30. This removes all but a trickle load from super capacitor 40, thus allowing a charge to build up on the super capacitor from wireless-charging circuit 42. This condition continues until an operator actuates one of the switches of user input device 28. The switch actuation pulls the base of transistor Q1 low, thus causing the switch to turn on pulling the enable input of voltage regulator U1 to a higher state which enables the voltage regulator to produce an output voltage Vdd. This voltage is supplied to microprocessor 32. Microprocessor 32 responds to the application of power by powering up. Once voltage regulator U1 produces an output voltage, FET U3 latches its enable line high until capacitor C9 charges up sufficiently to turn FET U3 off. The result is that power is supplied to controller 30 for a momentary period of time upon the actuation of user input device 28 by a user. The time period is set to be sufficient for controller 30 to process the user input and transfer the user input to base station 16. In the illustrated embodiment, the impulse time interval of power impulse circuit 52 is 250 milliseconds, but other time may be selected.

An advantage of load regulator 50 is that it substantially completely isolates response unit controller 30 from super capacitor 40 until a user presses a key on user input device 28. This isolates controller 30 from the super capacitor 40 to allow the charge on the super capacitor to build sufficiently to operate controller 30. It also removes the load from the super capacitor when the user is not operating input device 28. It also removes the power to controller 30 after the period of time set by one-shot circuit 58 should the user hold the key down for longer than the period set by the one-shot circuit. It should be understood that certain of the advantages of load regulator 50 can be achieved by variations thereof. For example, such load regulator may be in the form of mechanically isolating the supply voltage from controller 30 unless a user presses a switch of user input device 28. However, the use of load regulator 50 with power impulse circuit 52 has the advantage of not allowing ongoing drain on the super capacitor should the user hold the switch in the pressed state for a long period of time.

In the illustrated embodiment, voltage regulator U1 is a low drop-out voltage regulator (LDO). Such LDO has the advantage of a minimal decrease in voltage by the LDO such that its output voltage is closer to its input.

Figure 6:
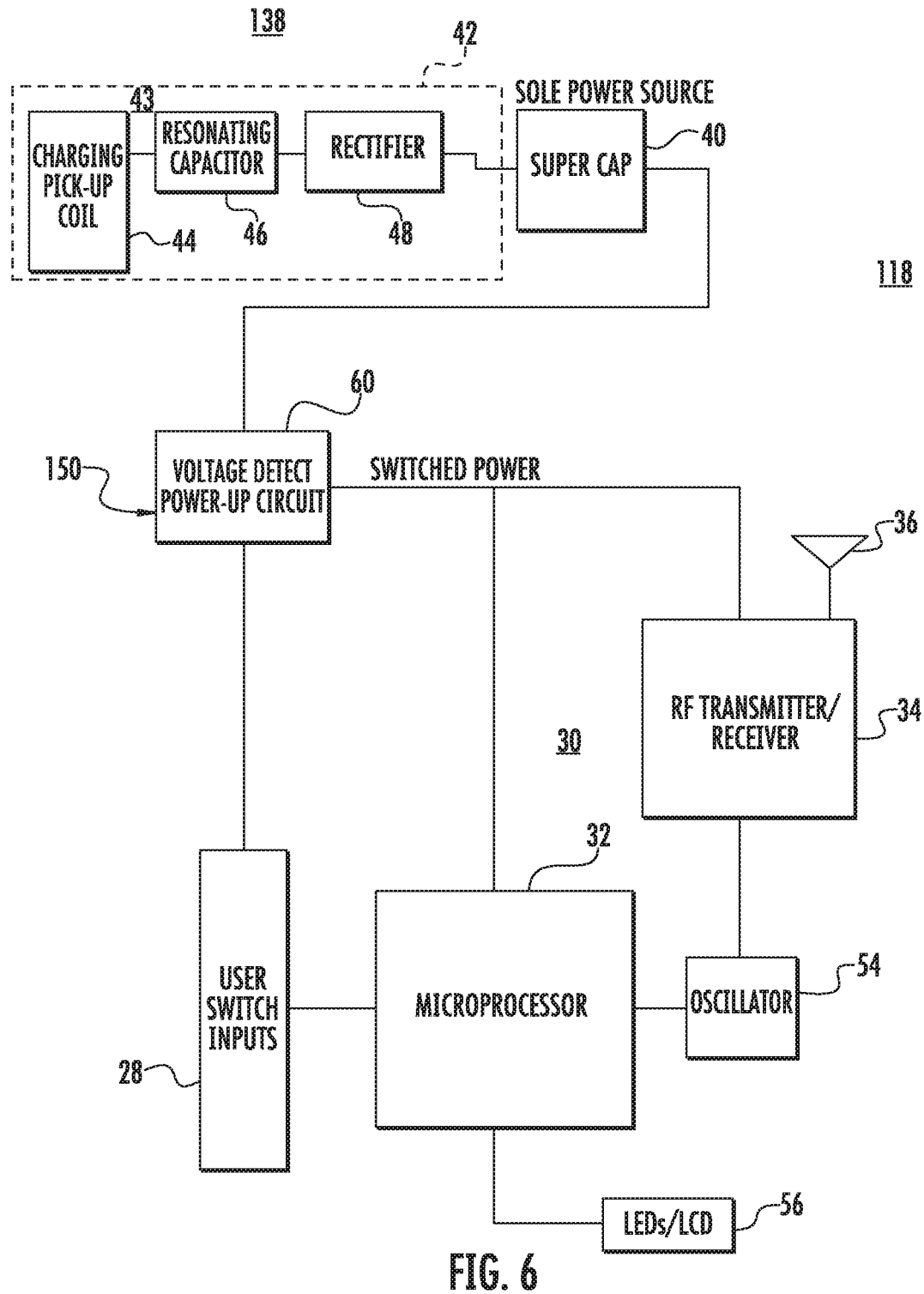
FIG. 6 is a block diagram of an alternative embodiment of a response unit.
Figure 8A:
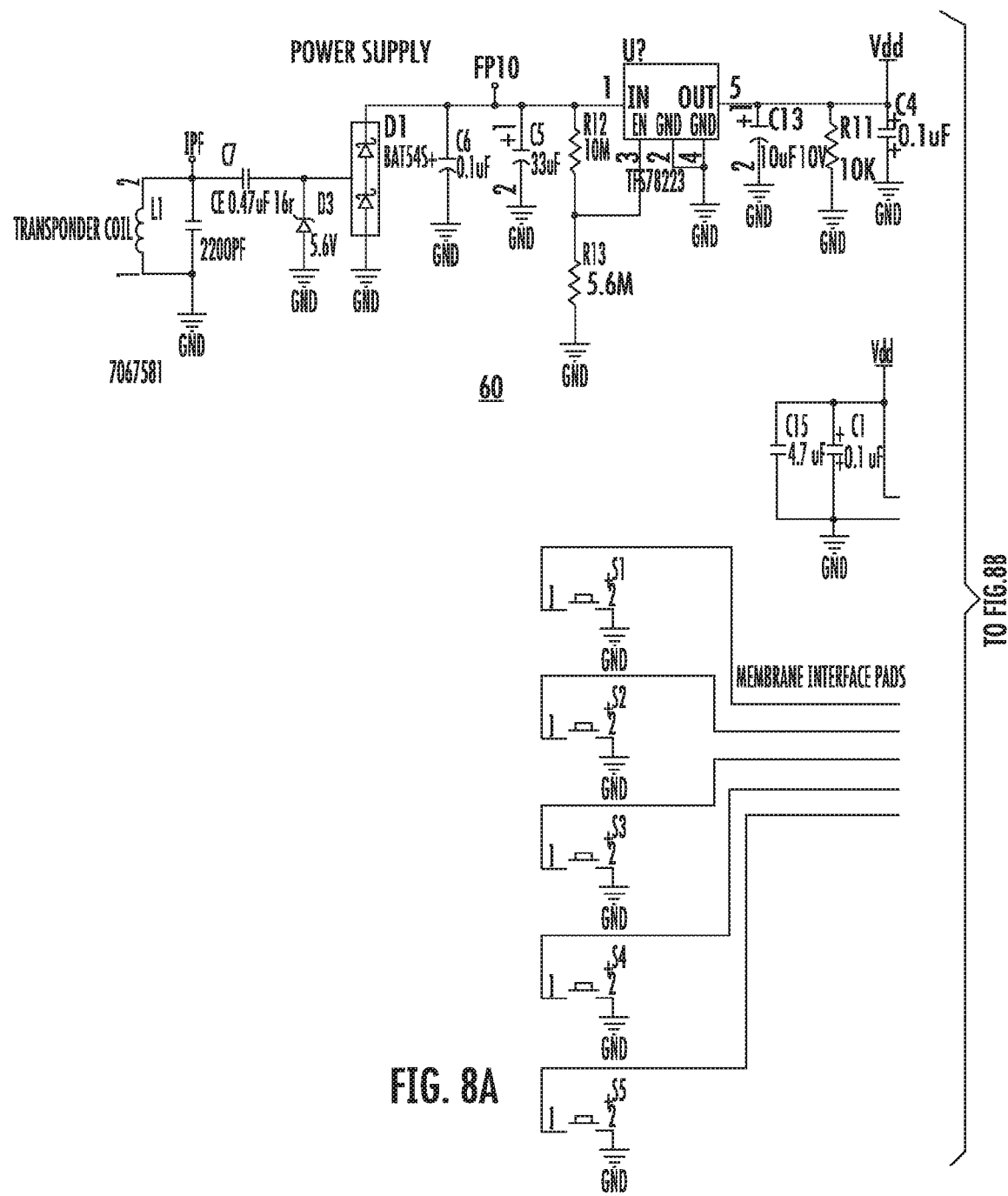
FIG. 8A is one portion of a more complete electronic schematic diagram of the response unit in FIG. 6.
Figure 8B:
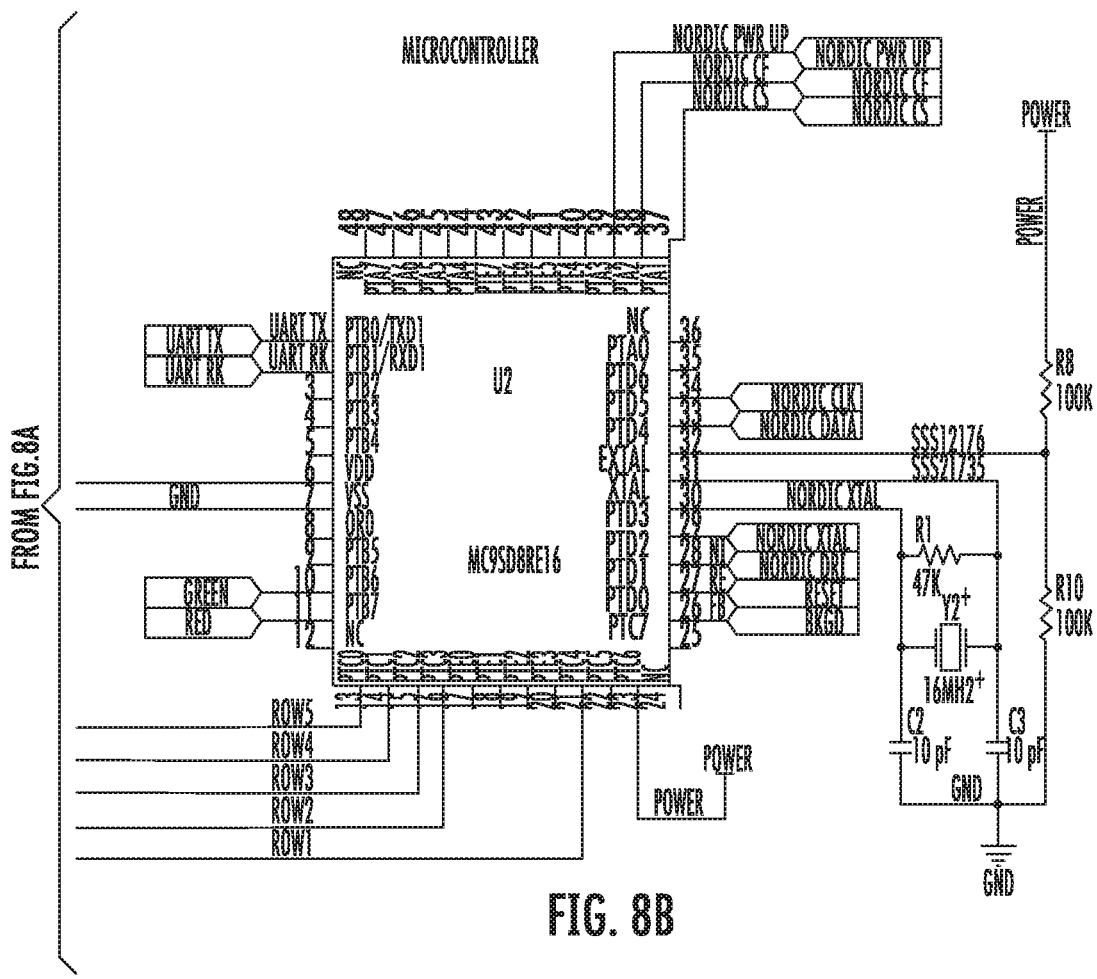
FIG. 8B is the other portion of the electronic schematic diagram in FIG. 8A.

An alternative embodiment of a wireless response system includes a response unit 118 having a power supply 138 including a load regulator 150 in the form of a voltage detecting voltage supply 60 that is adapted to withhold power from controller 30 until the voltage on super capacitor 40 reaches a particular level (FIGS. 6-8). Load regulator 150 also has hysteresis and thereby is configured to continue to supply power to controller 30 when voltage on the super capacitor decreases below the particular level. Load regulator 150 includes a voltage regulator U2 that, in the illustrated embodiment, is a low drop-out voltage regulator with an enabling line having hysteresis. The enable line to voltage regulator U2 is connected with a voltage divider formed by resisters R12 and R13 connected in parallel with super capacitor 40. In this manner, while super capacitor 40 is being charged, the voltage across the capacitor starts by being too low to activate enabling input to voltage regulator U2. As a result, voltage regulator U2 does not produce a voltage Vdd supplied to microprocessor 32. Once voltage across super capacitor 40 rises sufficiently to enable voltage regulator U2, voltage Vdd is supplied to controller 30. In this manner, the super capacitor is allowed to accumulate a charge sufficient to power the controller before the controller is allowed to operate. However, once the controller is powered, it is allowed to continue to operate even after the level of Vdd drops below that initially supplied to the controller because of the hysteresis of voltage regulator U2. Also, microprocessor 32 is programmed in a manner that, once the microprocessor is initially powered, it wakes up only long enough to place itself in a quiescent mode or sleep mode. Therefore, it is not necessary for the microprocessor to wait for a period of non-use before entering the sleep mode. Once in the sleep mode, microprocessor 32 remains in the sleep mode until interrupted, such as by the operation of user input device 28, or the like. Microcomputer 32 draws less current in its sleep mode than is produced by power supply 38. In this manner, super capacitor 40 can continue to accumulate a charge even after the voltage across the super capacitor is sufficient to produce voltage Vdd and activate microprocessor 32. Also, where super capacitor 40 is not being charged, the accumulated charge on the super capacitor is conserved when microprocessor 32 is in a sleep mode. This allows longer operation of the response unit between charges.

Figure 9:
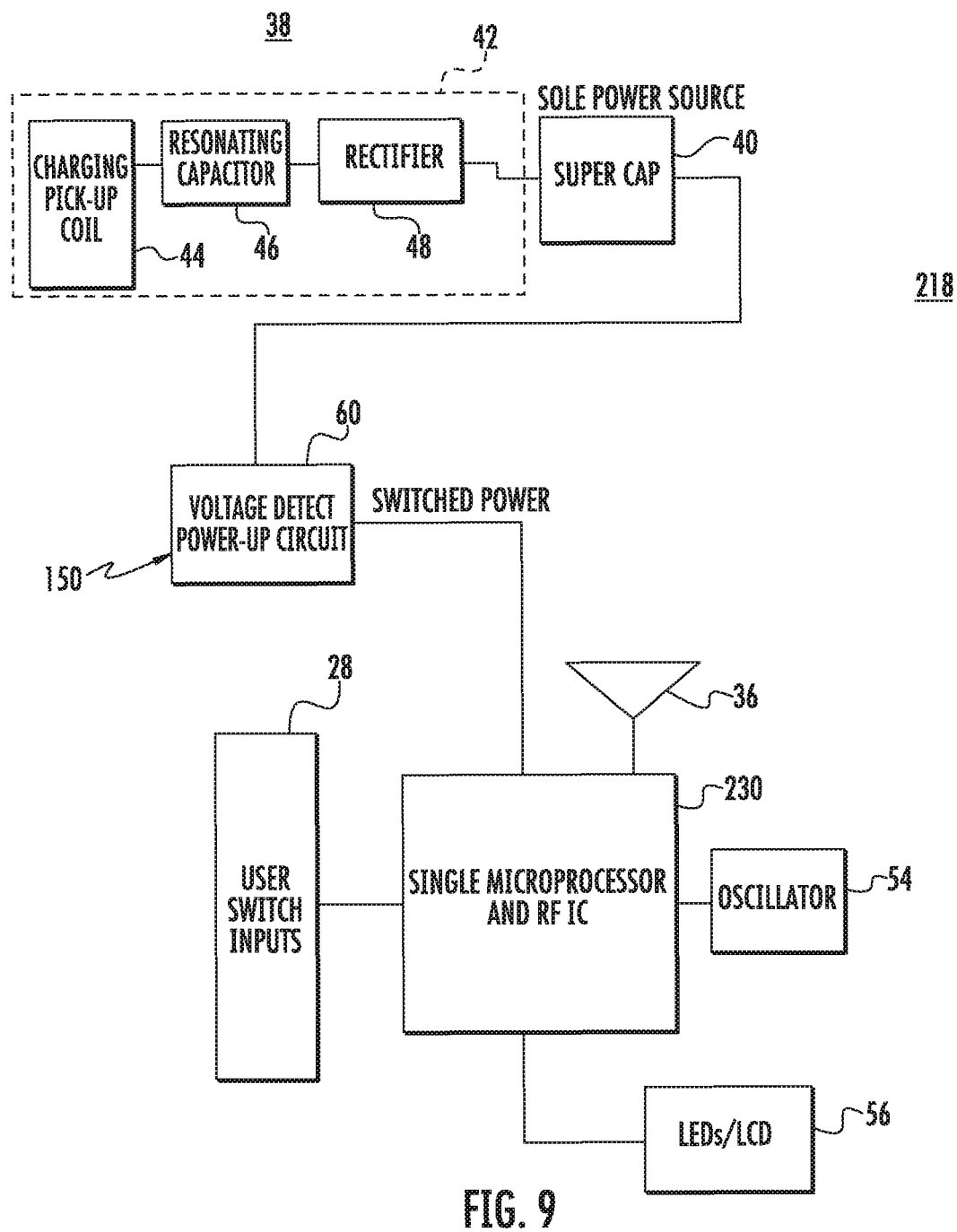
FIG. 9 is a block diagram of another alternative embodiment of a response unit.

In another embodiment, a wireless response system includes a response unit 218 in which a controller 230 includes a microprocessor and radio combined in a single integrated circuit (FIG. 9). Otherwise, response unit 218 is similar to response unit 118.

Figure 10:
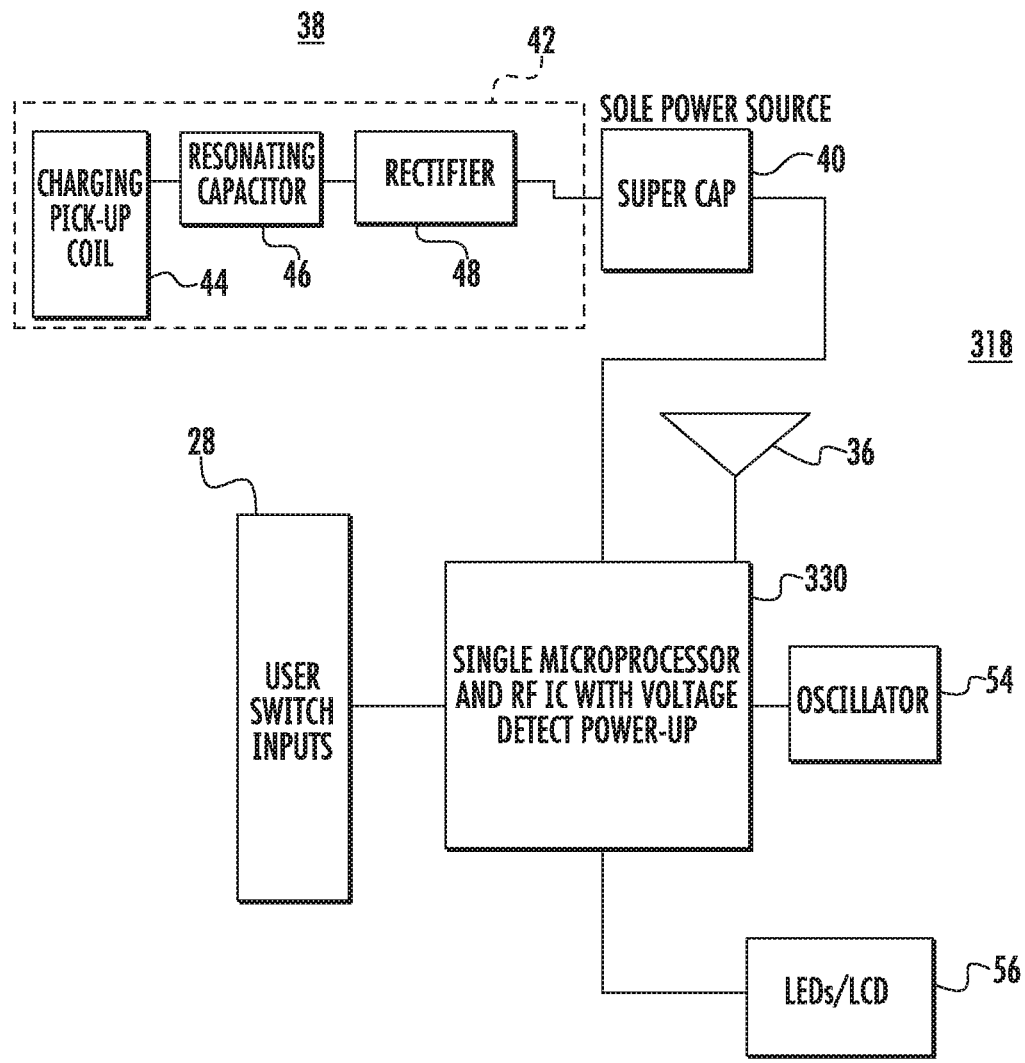
FIG. 10 is a block diagram of yet another alternative embodiment of a response unit.
Figure 11:
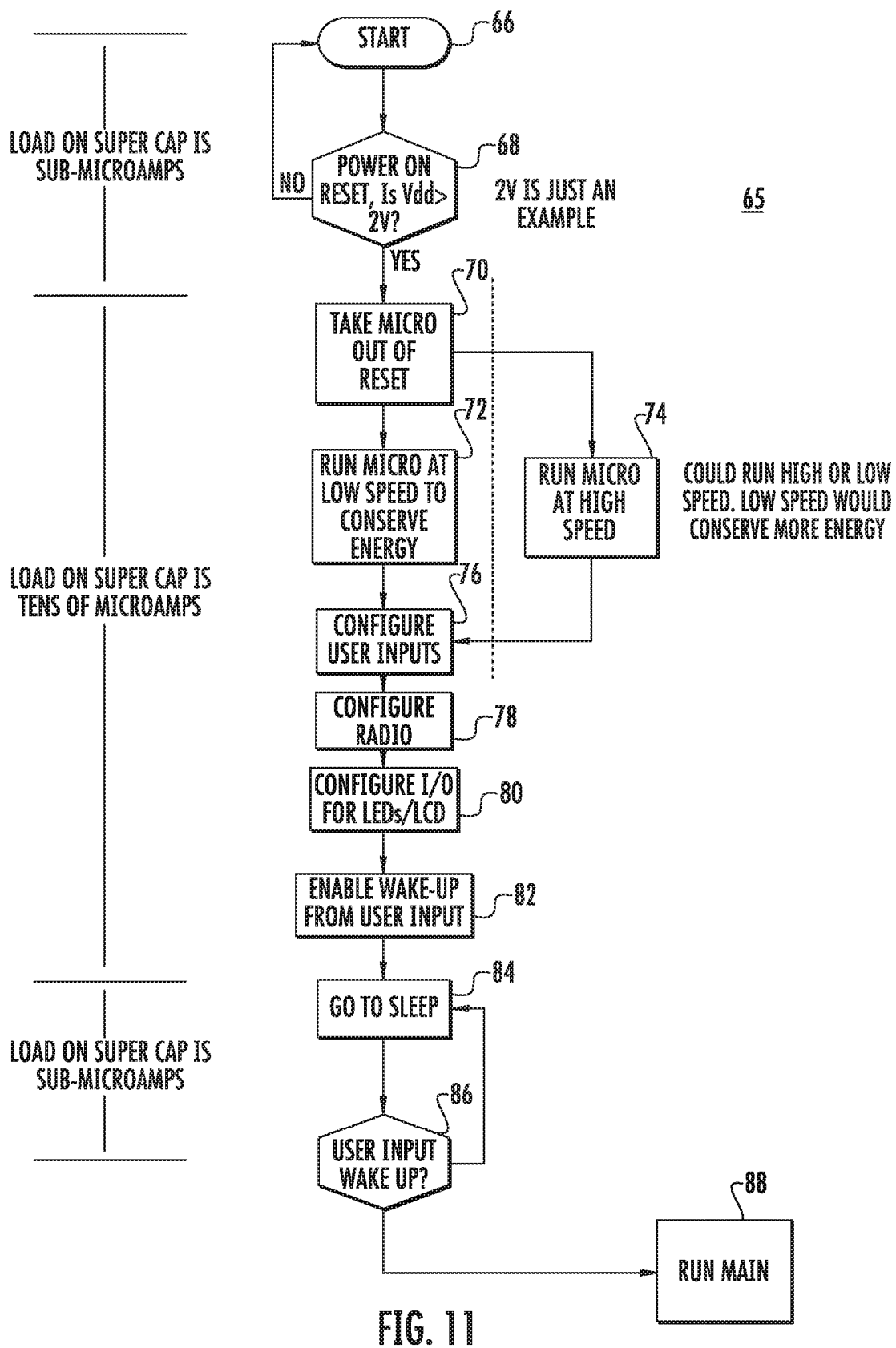
FIG. 11 is a flowchart of a computer program useful with the response unit in FIG. 10.

In yet another embodiment, a wireless response system includes a response unit 318 having a controller 330 that is programmed to limit the current that is drawn from super capacitor 40 in a manner that allows super capacitor 40 to acquire a sufficient charge from wireless-charging circuit 42 to operate controller 330 (FIGS. 10 and 11). In this embodiment, controller 330 is programmed to respond to an application of power to said controller 330 by entering a quiescent mode. Thus, once voltage across super capacitor 40 is high enough to power controller 330, the super capacitor is able to continue to accumulate a charge because the controller will be in a quiescent, or sleep, mode. This is accomplished in the illustrated embodiment by controller 330 being programmed with a computer program 65 which starts at 66 with controller 330 staying in a reset mode until it is determined at 68 that voltage on super capacitor 40 reaches a particular level, such as 2 VDC, for example. When controller 330 is in such reset mode, the current draw by the controller is less than that applied by charging circuit 42 to charge super capacitor 40. When it is determined at 68 that the voltage on super capacitor 40 reaches the particular level, the controller is taken out of the reset mode at 70 by configuring inputs and outputs thereof at 76, 78 and 80. During such steps, the controller can be run at a slower speed (72) to further conserve power or a faster speed (74) to configure the controller quicker but at a higher rate of power consumption. Once controller 30 is configured (76, 78, 80) program 65 enables controller 30 at 82 to be able to wake up upon receiving a user input from user input device 28. Program 65 then places controller 30 in a quiescent mode at 84. Program 65 then waits receipt of a user input at 86. When a user input is received, program 65 then runs the main program at 88. The main program processes the user input, which causes the user input to be wirelessly transferred to base station 16 and go back to sleep.

Figures 12A, 12B, 12C:
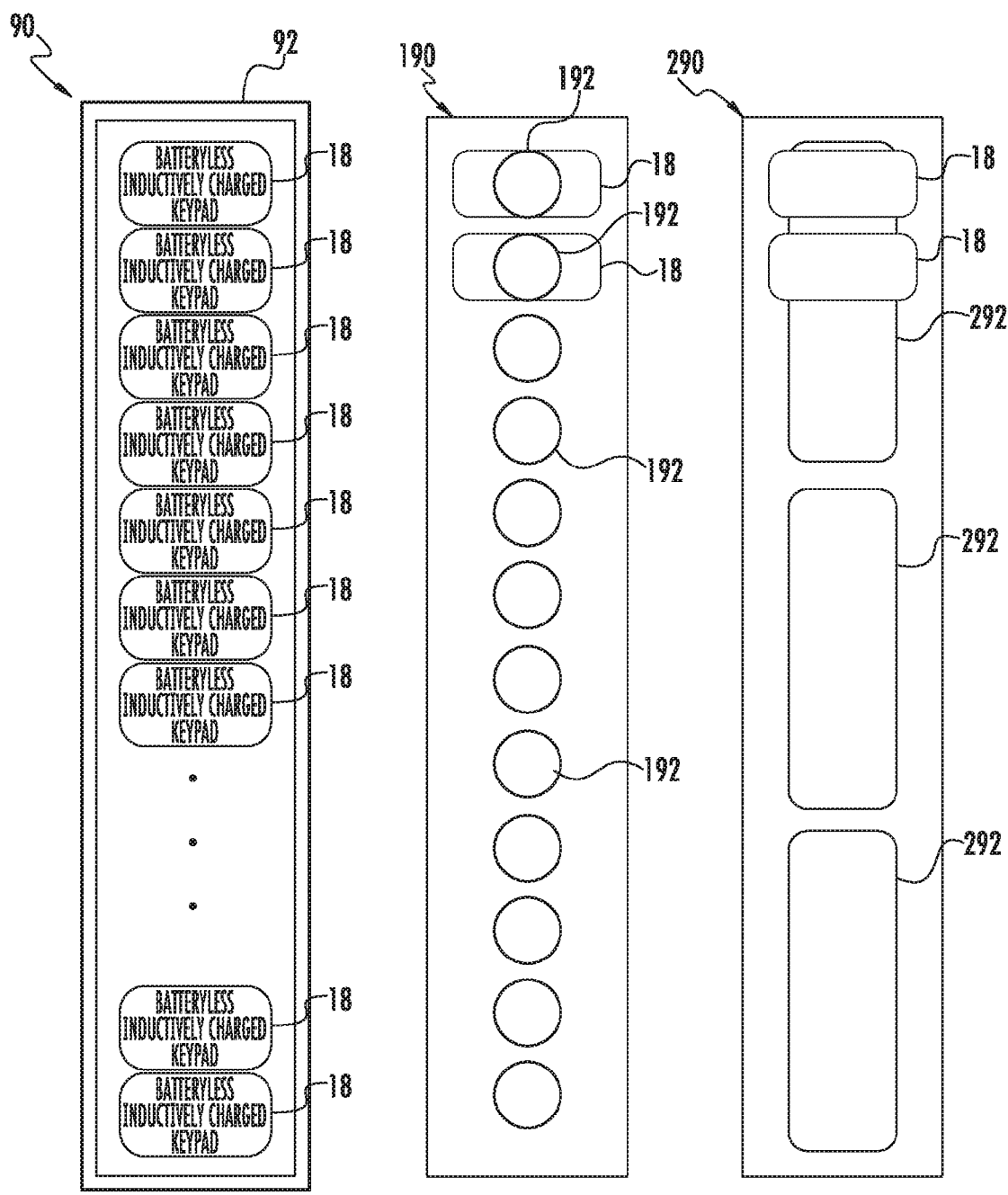
FIG. 12A is a diagram of a coil layout for a wireless charging station.
FIG. 12B is the same view as FIG. 12A of an alternative coil layout for a wireless charging station.
FIG. 12C is the same view as FIG. 12A of another alternative coil layout for a wireless charging station.

Wireless response system 15 includes a wireless charging station, or device, 90, 190, 290 that is configured to inductively couple electrical energy to charging circuit 42 by way of pickup coil 44. Such wireless charging station includes one or more charging coils 92, 192, 292 and a coil-driving circuit 94, 194. In the embodiments illustrated in FIGS. 12a and 12c, respective charging coils 92, 292 are configured to inductively couple with a plurality of response units 18. This may be accomplished by charging coils 92, 192 being made up of one or more loops of an electrical conductor that at least partially surrounds the response units. In FIG. 12a, one conductor loop completely surrounds a plurality of response units. In FIG. 12c a plurality of charging coils 292 each includes an electrical conductor loop that partially surround multiple response units 18. In an embodiment illustrated in FIG. 12b, a charging coil 192 is provided for each response unit. It is understood that a non-magnetic housing 93 is provided to support the multiple response units in the wireless charging station.

Figure 13:
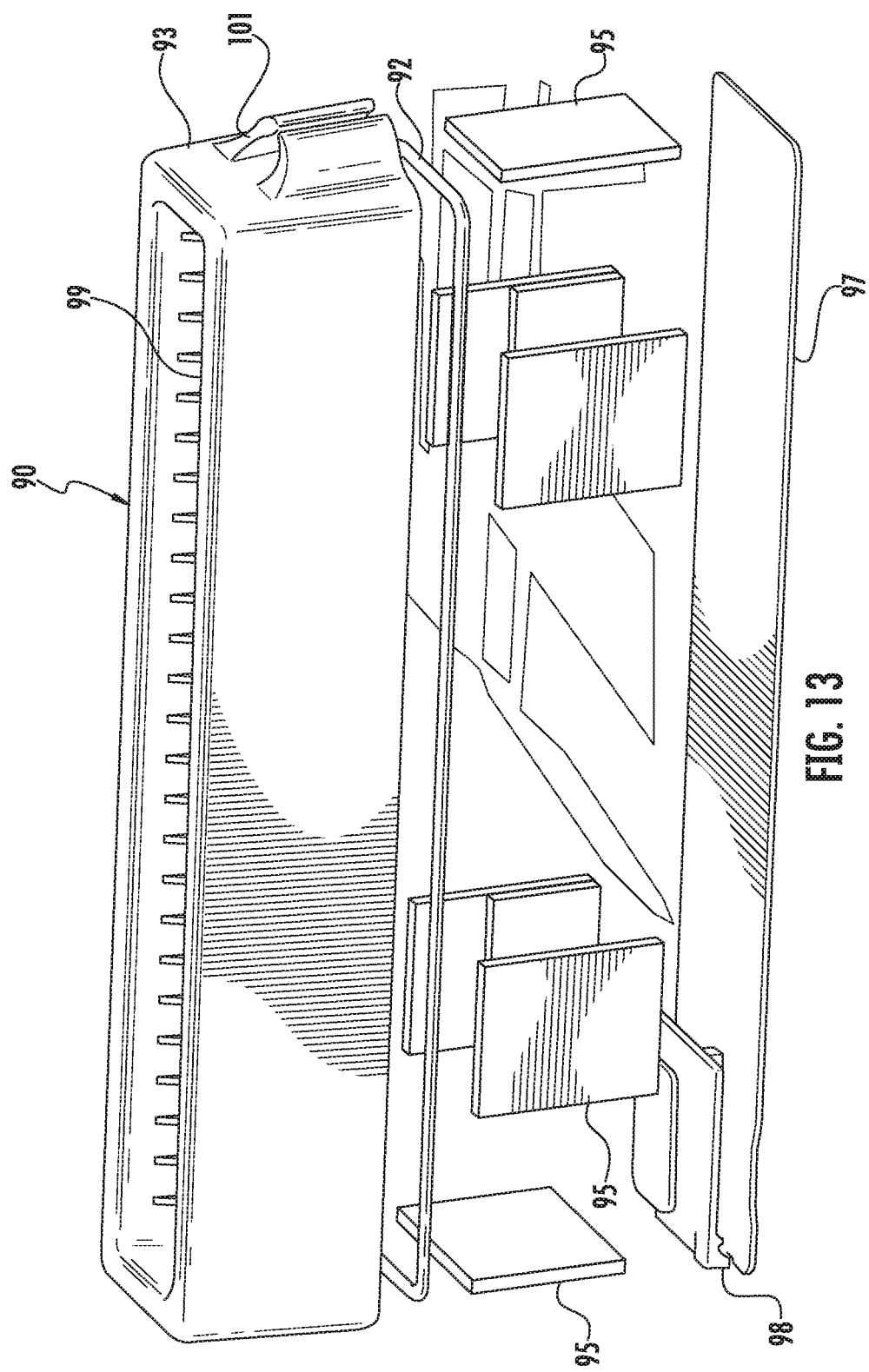
Figure 14:
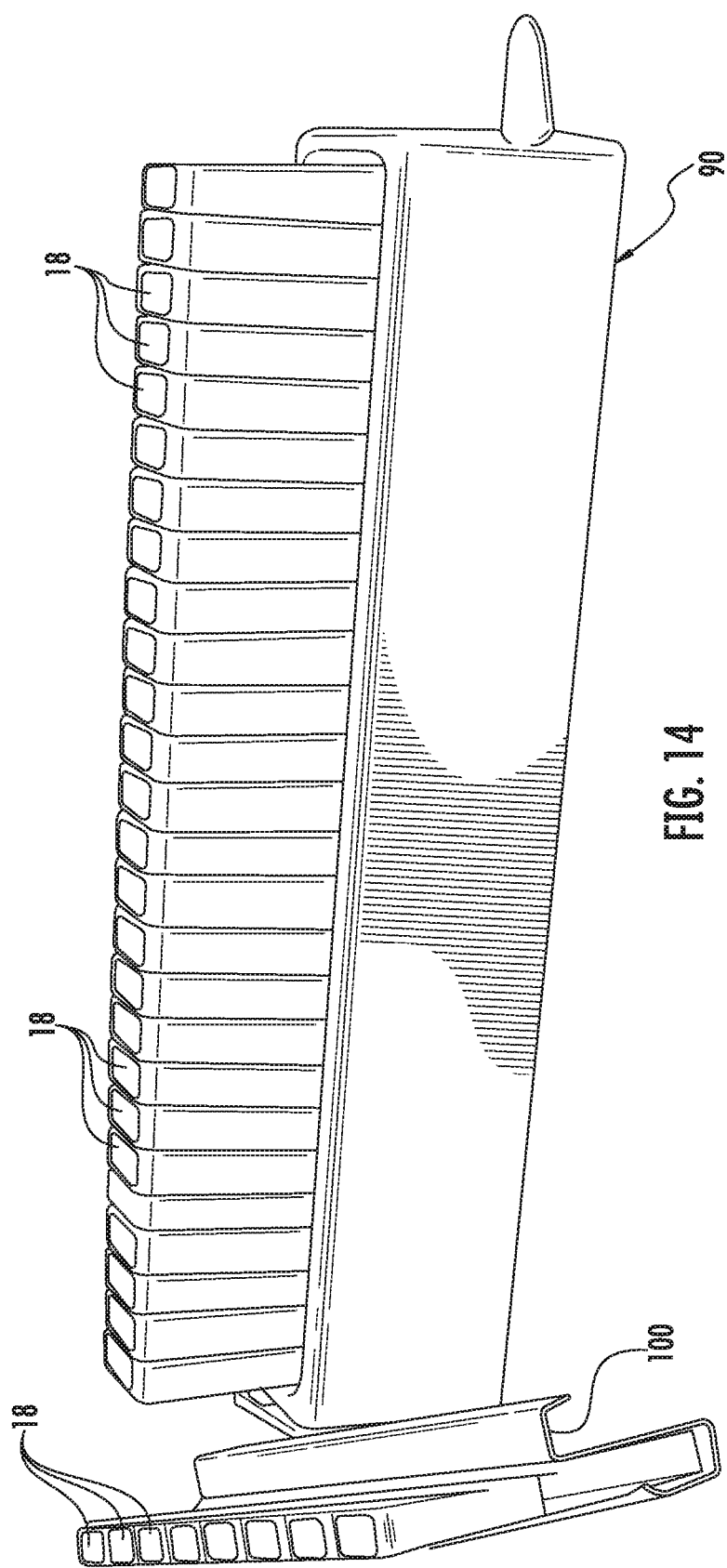
FIG. 14 is a perspective view of the wireless charging station illustrated in FIG. 13 loaded with response units.
Figure 15:
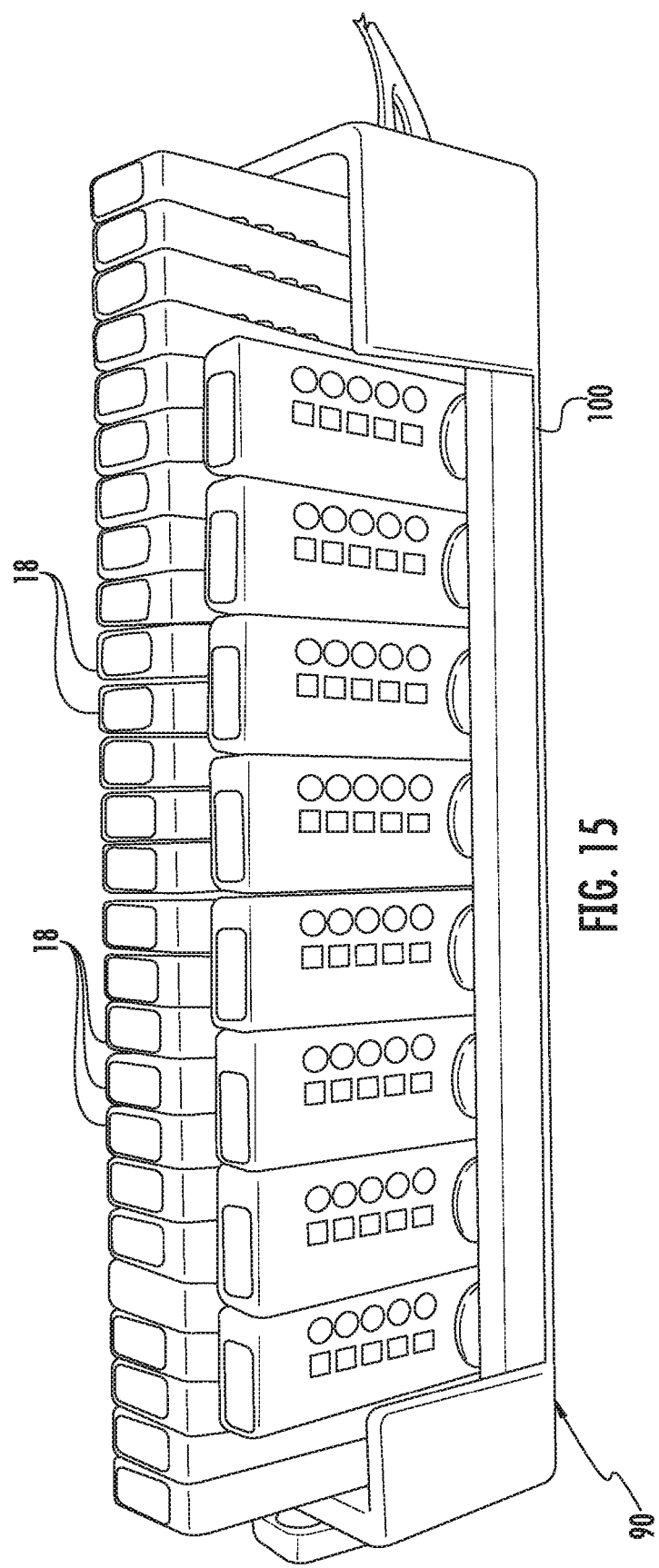
FIG. 15 is the same view as FIG. 14 with the auxiliary cradle in a use position.
Figure 16:
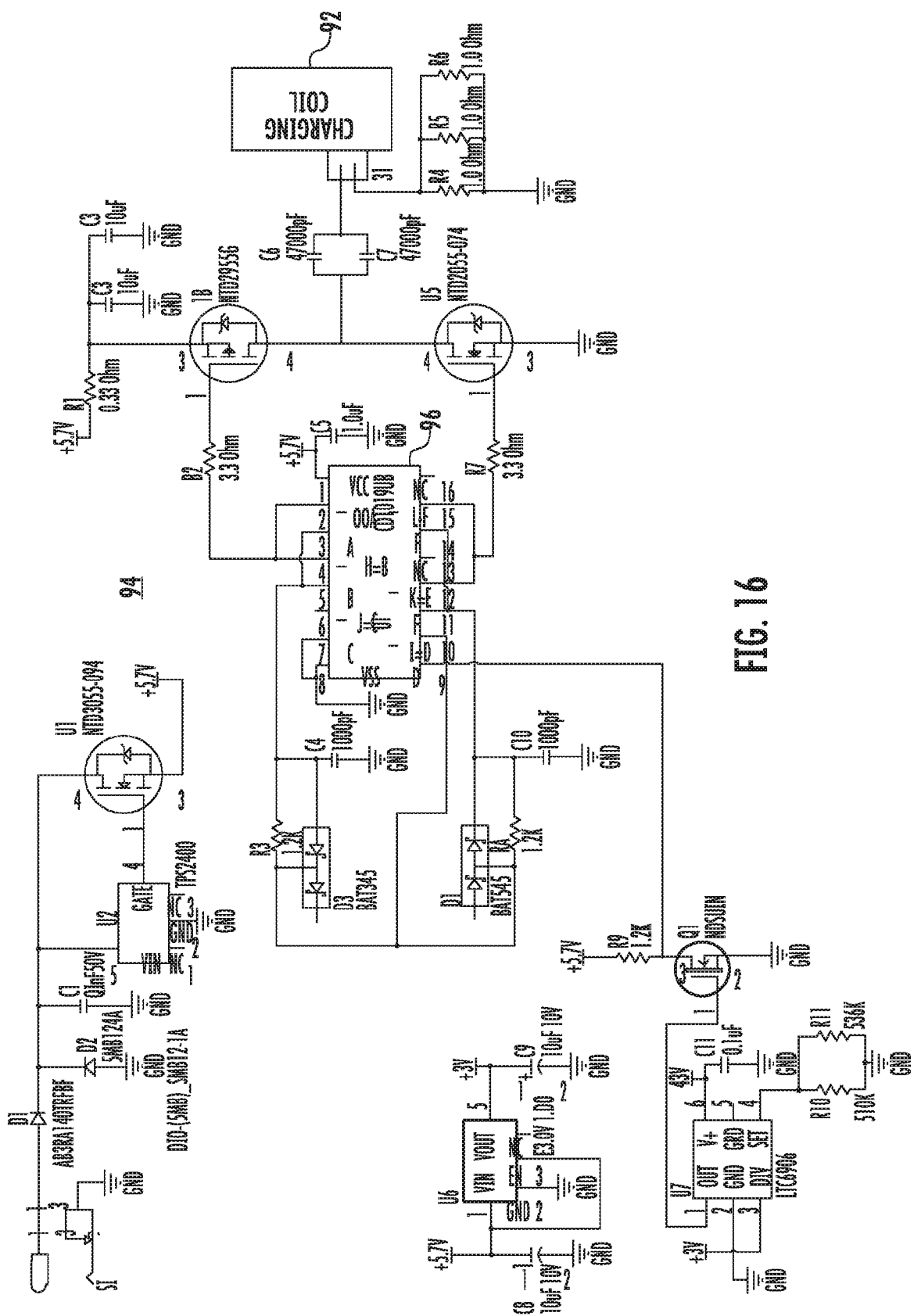
FIG. 16 is an electronic schematic diagram of a wireless charging station charge circuit.
Figure 17:
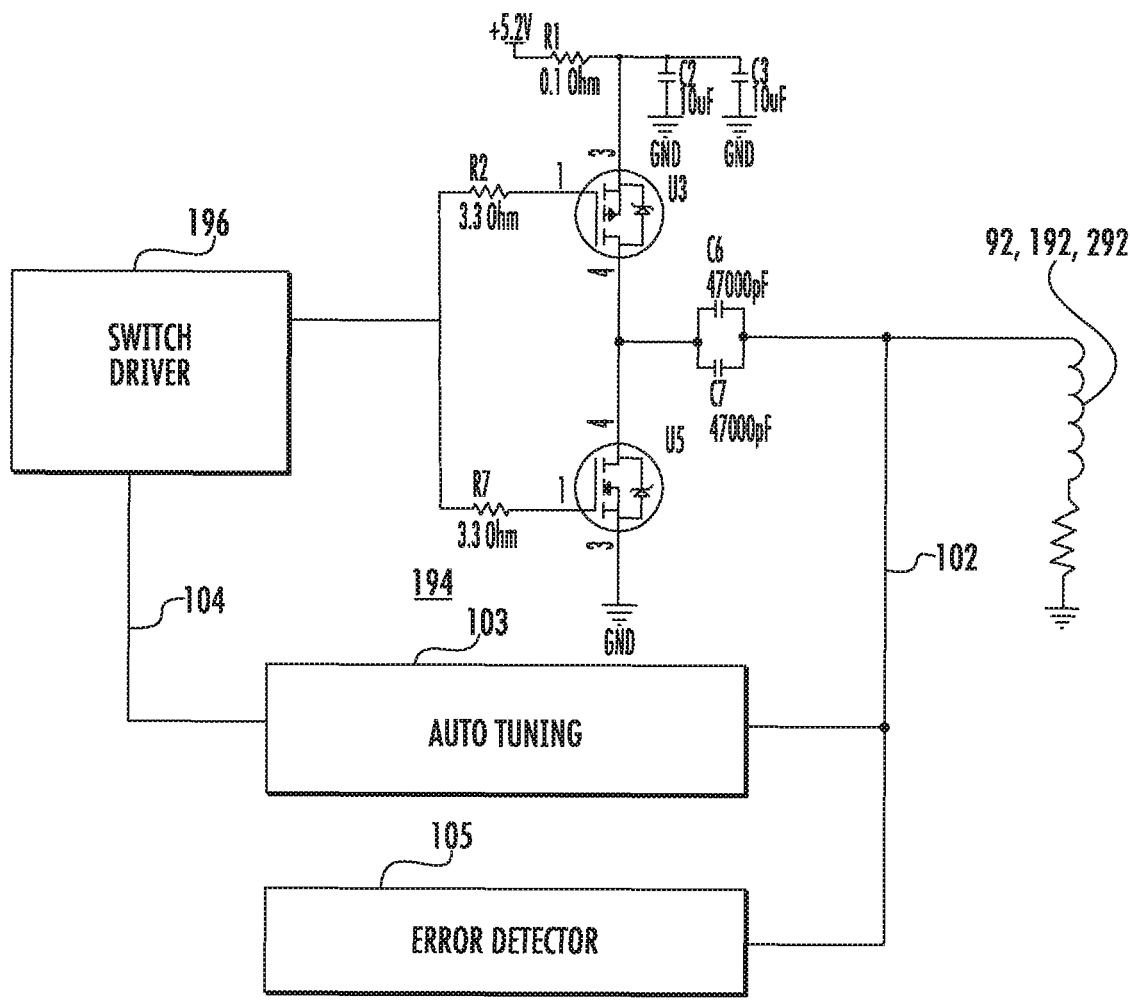
FIG. 17 is a block diagram of an alternative embodiment of a wireless charging station charge circuit.
Figure 18A:
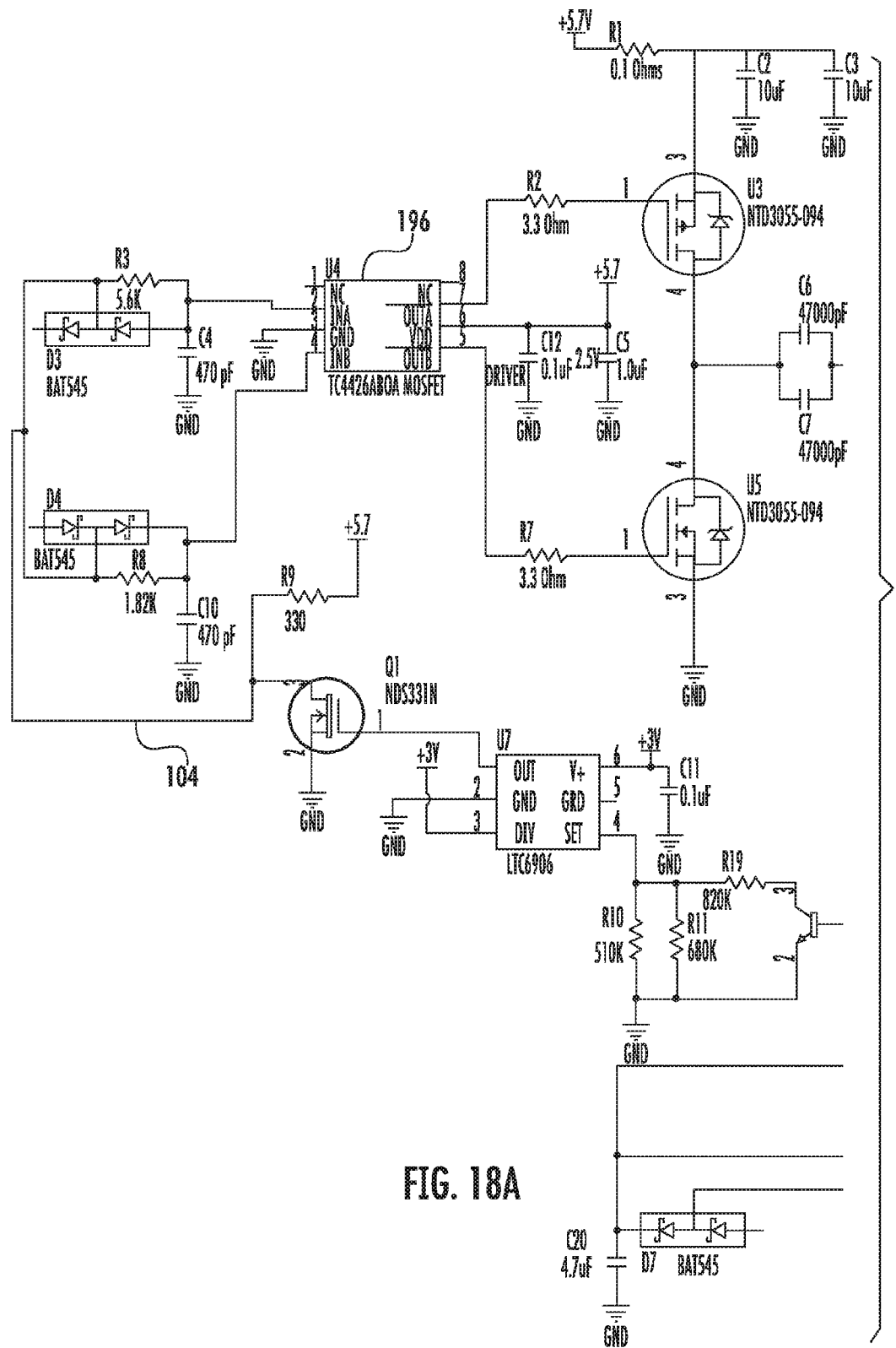
FIG. 18A is one portion of an electronic schematic diagram of the wireless charging station charge circuit in FIG. 17.
Figure 18B:
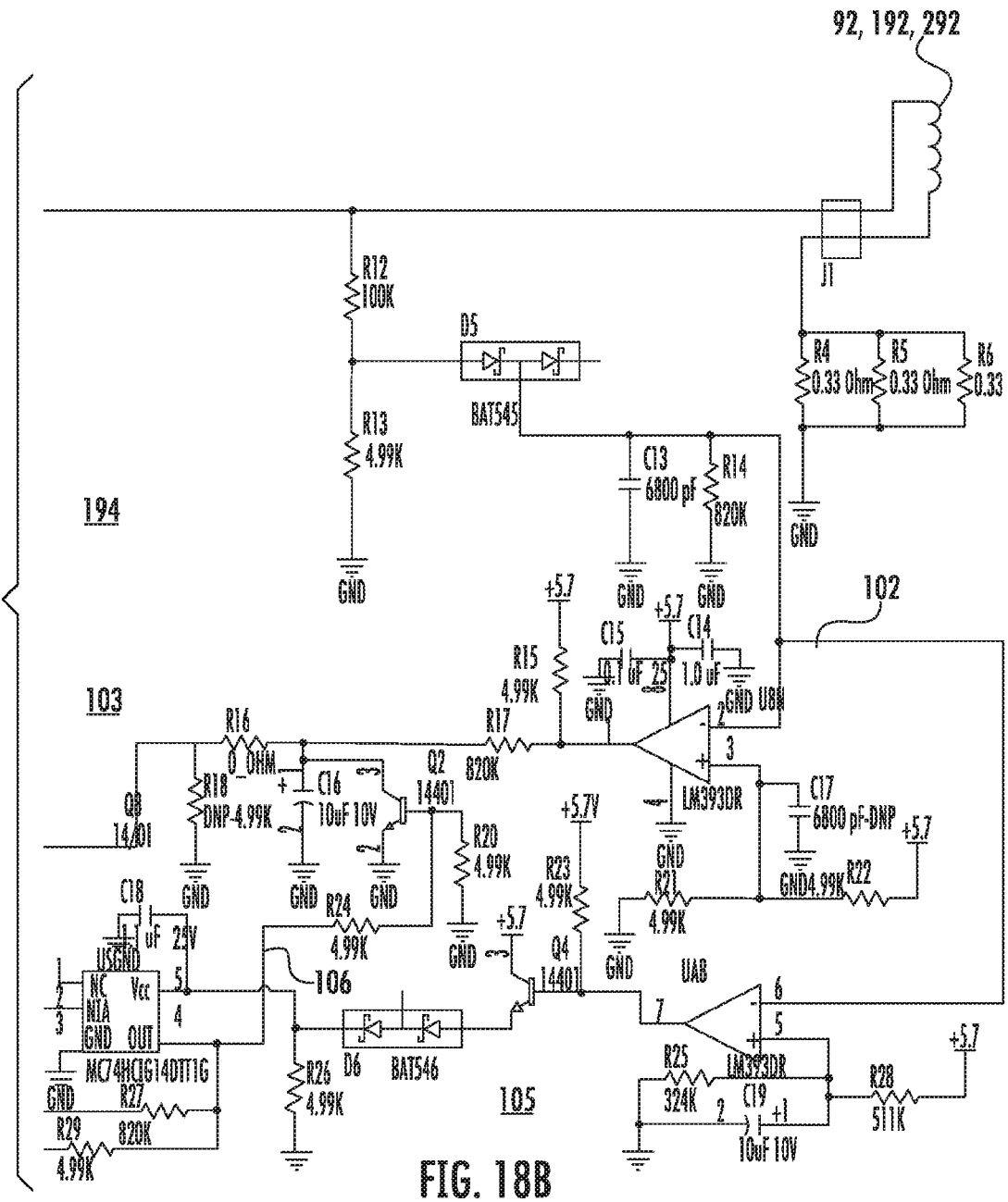
FIG. 18B is the other portion of the electronic schematic diagram in FIG. 18A.

Referring to FIGS. 13-15, charging station 90 includes a plurality of coil support blocks 95 made of an electrically insulating material that provide an interference fit between charging coil 92 and a base 97 when base 97 is attached to housing 93. In particular, blocks 95 are sized to press coil 92 into a crevice in housing 93 when base 97 is attached to the housing. A circuit board 98 that contains charge circuit 94 is attached inside of housing 93. Coil 92 surrounds an opening 99 in which response units 18 are positioned for charging of super capacitor 40.

Charging station 90 may further include one or more auxiliary cradles 100 that are capable of supporting one or more response units 18, as seen in FIG. 14. With cradle 100 supported from a side of housing 93, as seen in FIG. 15, the response units 18 positioned in the cradle will be magnetically coupled to coil 92 and thereby be wirelessly charged in a similar manner as response units 18 positioned in opening 99. However, the electrical conductor or coil 92 will run adjacent to, not surround, response units positioned in cradle 100. An additional cradle 101 may be defined at an end portion of housing 93. Cradle 101 is defined to hold base station 16. Base station 16 is configured to interface with a UBS port of personal computer 26. Since base station 16 receives electrical power from the UBS port, it does not have a super capacitor and is sufficiently spaced from coil 92 so any electrical charge present at cradle 101 is not coupled to base station 16 from coil 92 when the base station is in cradle 101 because there is no circuitry in base station 16 to respond to the field.

Coil-driving circuit 94 is a resonance circuit including coil 92, 192 or 292. Coil-driving circuit 94 includes one or more resonance capacitors C6, C7 and a pair of electrical series connected field-effect transistors U3, U5 and a transistor drive circuit 96. Transistor drive circuit 96 ensures that only one of transistors U3, U5 is conducting at a time in order to ensure that there is never a direct short circuit though transistors U3 and U5. This is accomplished by transistor drive circuit 96 providing dead time during which neither of transistors U3, U5 is conducting between intervals when one of transistors U3, U5 is conducting. If more than one charging coil is used, they may be driven from a common set of transistors U3, U5, or a separate set of transistors U3, U5 and a resonance capacitor may be provided for each coil.

In an alternative embodiment, a coil-driving circuit 194 includes a drive circuit 196 to drive electrically series connected field-effect transistor (FET) U3, U5 which are connected through resonance capacitors C6, C7 with charging coil 92, 192 or 292. The connection between capacitors C6, C7 and the charging coil provides an input 102 to an auto-tuning circuit 103 which has an output 104 that is supplied to driver circuit 196. Auto-tuning circuit 103 responds to the peak voltage level at its input 102 by producing a variable frequency signal on its output 104 that is supplied to driver 196. Auto-tuning circuit 103 increases the frequency of the signal on output 104 when the peak-to-peak voltage level at input 102 decreases below a set voltage level. Driver 196 drives FETs U3, U5 at the same frequency as output 104 which increases the peak-to-peak voltage level across coil 92, 192, 292. Thus, auto-tuning circuit 103 acts as a feed-back loop to maintain a constant voltage across the charging coil.

If a large piece of metal, such as a scissors, stapler, or the like, is inadvertently placed in opening 99, or something else causes an excessive drain on charging coil 92, 192, 292, the frequency of output 104 may be operated at a peak level by auto-tuning circuit 103 and driving circuit 194 may still not be able to achieve regulation. An error-detection circuit 105 may be provided to supervise auto-tuning circuit. Error-detection circuit 105 responds to input 102 and produces an output 106 that is supplied to auto-tuning circuit 103. Output 106 is capable of resetting the auto-tuning circuit if input 102 drops below a threshold peak voltage level. Error-detection circuit 105 then allows an amount of time, such as 0.5 seconds, for auto-tuning circuit 103 to achieve regulation. However a longer or shorter period of time may be chosen. This periodic resetting of auto-tuning circuit 103 by error detection circuit 105 allows auto-tuning circuit 103 to attempt to achieve regulation of the voltage level across the charging coil. If regulation of voltage at input 102 is still not achieved after about 0.5 seconds, error detection circuit 105 once again resets auto-tuning circuit 103. If the metallic object is removed from opening 99, auto-tuning circuit 103 will once again achieve regulation of the voltage across the charging coil.

In the illustrated embodiment, auto-tuning circuit 103 includes a comparator U8A that compares the voltage at input 102 with a reference voltage. If it drops below the reference voltage then a transistor Q3 is switched which sinks a set input on a voltage to frequency converter U7 which increases the frequency of its output. The output of U7 is supplied to a transistor Q1 which provides input 104 to FET driver 164. Driver 164 drives FETs U3, U5 at a higher frequency which should raise the voltage level across the charging coil. Once comparator U8A determines that the voltage level on input 102 exceeds the threshold set for it, the frequency at which FETs U3, U5 are driven is decreased. This results in small adjustments to the frequency at which FETs Q3 and Q5 are driven.

Error detection circuit 105 also has a comparator U8B that compares the voltage level on input 102 against a reference. If it drops below a level of the reference, a transistor Q4 applies a voltage to a voltage to frequency circuit U9 which produces a low frequency output 106 that is supplied to a transistor Q2. When the voltage on output 106 reaches a threshold, it causes transistor Q2 to conduct which discharges capacitor C16 at the base of transistor Q3. This claims Q3 off until capacitor C16 charges through resistor R17. In this manner, error detection circuit 105 resets auto-tuning circuit 103, should it fail to achieve regulation.

While the foregoing description describes several embodiments of the present invention, it will be understood by those skilled in the art that variations and modifications to these embodiments may be made without departing from the spirit and scope of the invention, as defined in the claims below. For example, rather than using inductively coupled coils for supplying electrical energy to charge the super capacitor, it may be possible to use a photon-coupled charger. In such a charger, light generated by LED's in a charging station can be coupled to LED's in the portable device to generate current to charge the super capacitor. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A wireless response system, comprising:
   a base station and a plurality of response units, said response units wirelessly communicating with said base station in order to retrieve user responses received by said response units;
   each of said response units having a user input device that is adapted to receiving user input selections, a controller that is responsive to said user input device to process user inputs and to communicate responses wirelessly to said base station and a power supply that is adapted to supply power to operate said controller;
   wherein said power supply comprises a super capacitor and a wireless-charging circuit that is adapted to charge said super capacitor;
   wherein said wireless-charging circuit is adapted to supply a current to charge said super capacitor and wherein said power supply or said controller is configured to control the current that is drawn from said super capacitor in a manner that allows said super capacitor to acquire sufficient charge from said wireless-charging circuit to operate said controller.

2. The wireless response system as claimed in claim 1 including a voltage-detecting power source that is adapted to withhold power from said controller until voltage on said super capacitor reaches a particular level.

3. The wireless response system as claimed in claim 2 wherein said power source is adapted to supply power to said controller when voltage on said super capacitor reaches the particular level and to continue to supply power to said controller when voltage on said super capacitor decreases below the particular level.

4. The wireless response system as claimed in claim 3 wherein said power source comprises a voltage regulator.

5. The wireless response system as claimed in claim 4 wherein said voltage regulator comprises a low drop-out voltage regulator.

6. The response system as claimed in claim 1 wherein said charge circuit comprises a voltage multiplier.

7. The wireless response system as claimed in claim 1 including a load regulator, said load regulator substantially withholds power from said controller until occurrence of an event.

8. The wireless response system as claimed in claim 7 wherein said load regulator comprises a power impulse circuit, said power impulse circuit adapted to apply an output voltage to said controller upon occurrence of the event for a limited period of time.

9. The wireless response system as claimed in claim 8 wherein said power impulse circuit includes a voltage regulator and a trigger, said trigger enabling said voltage regulator to apply the output voltage to said controller.

10. The wireless response system as claimed in claim 9 wherein said trigger enables said voltage regulator for a limited period of time upon actuation of said user input device.

11. The wireless response system as claimed in claim 9 wherein said voltage regulator comprises a low drop-out voltage regulator.

12. The wireless response system as claimed in claim 1 wherein said controller is programmed to respond to an application of power to said controller by entering a quiescent mode.

13. The wireless response system as claimed in claim 1 wherein said controller is programmed to stay in a reset mode until voltage on said super capacitor reaches a particular level.

14. The wireless response system as claimed in claim 13 wherein said controller is programmed to respond to the voltage on said super capacitor reaching the particular level by configuring inputs and outputs thereof and entering the quiescent mode.

15. The wireless response system as claimed in claim 14 wherein said controller is programmed to awake from the quiescent mode in response to the operation of said user input device.

16. A wireless response system, comprising:
a base station and a plurality of response units, said response units wirelessly communicating with said base station in order to retrieve user responses received by said response units;
each of said response units having a user input device that is adapted to receiving user input selections, a controller that is responsive to said user input device to process user inputs and to communicate responses wirelessly to said base station and a power supply that is adapted to supply power to operate said controller;
wherein said power supply comprises a super capacitor and a wireless-charging circuit that is adapted to charge said super capacitor, wherein said wireless-charging circuit is adapted to supply a current to charge said super capacitor; and
a wireless charging station adapted to inductively couple electrical energy to said charging circuit, wherein said wireless charging station comprises a charging coil and a coil-driving circuit wherein said coil-driving circuit comprises a pair of electrical series connected field-effect transistors and a transistor drive circuit, said transistor drive circuit ensuring only one of said transistors is conducting at a time.

17. The wireless response system as claimed in claim 16 wherein said charging coil is configured to inductively couple with a plurality of said response units.

18. The wireless response system as claimed in claim 17 wherein said charging coil comprises at least one loop of an electrical conductor that is configured to at least partially surround said plurality of said response units.

19. The wireless response system as claimed in claim 18 wherein said at least one loop of an electrical conductor completely surrounds said plurality of said response units.

20. The wireless response system as claimed in claim 16 wherein said transistor drive circuit provides dead time during which neither of said transistors is conducting between intervals when one of said transistors is conducting.

21. The wireless response system as claimed in claim 16 wherein said coil driving circuit comprises an auto-tuning circuit that regulates voltage across said charging coil by modifying the frequency of the coil driving circuit.

22. The wireless response system as claimed in claim 21 wherein said coil driving circuit includes an error detection circuit that determines that said auto-tuning circuit has failed to achieve regulation.

23. The wireless response system as claimed in claim 22 wherein said error detection circuit monitors voltage across said charging coil and resets said auto-tuning circuit if the voltage across said charging coil is below a threshold.

24. A wireless response system, comprising:
a base station and a plurality of response units, said response units wirelessly communicating with said base station in order to retrieve user responses received by said response units;
each of said response units having a user input device that is adapted to receiving user input selections, a controller that is responsive to said user input device to process user inputs and to communicate responses wirelessly to said base station and a power supply that is adapted to supply power to operate said controller;
wherein said power supply comprises a super capacitor and a wireless-charging circuit that is adapted to charge said super capacitor;
wherein said wireless-charging circuit is adapted to supply a current to charge said super capacitor and wherein said power supply or said controller is configured to control the current that is drawn from said super capacitor in a manner that allows said super capacitor to acquire sufficient charge from said wireless-charging circuit to operate said controller: and
a wireless charging station adapted to inductively couple electrical energy to said charging circuit, wherein said wireless charging station comprises a charging coil and a coil-driving circuit wherein said coil-driving circuit comprises a pair of electrical series connected field-effect transistors and a transistor drive circuit, said transistor drive circuit ensuring only one of said transistors is conducting at a time.

* * * * *